US012709338B2

(12) United States Patent
Agnew

(10) Patent No.: US 12,709,338 B2
(45) Date of Patent: Aug. 18, 2026

(54) ARRANGEMENTS FOR TRACTIVE ELEMENTS OF POWER MACHINES

(71) Applicant: Doosan Bobcat North America, Inc., West Fargo, ND (US)

(72) Inventor: Dennis Agnew, Moffit, ND (US)

(73) Assignee: Doosan Bobcat North America, Inc., West Fargo, ND (US)

( * ) Notice: Subject to any disclaimer, the term of this patent is extended or adjusted under 35 U.S.C. 154(b) by 872 days.

(21) Appl. No.: 17/966,095

(22) Filed: Oct. 14, 2022

(65) Prior Publication Data

US 2023/0124346 A1 Apr. 20, 2023

Related U.S. Application Data

(60) Provisional application No. 63/256,336, filed on Oct. 15, 2021.

(51) Int. Cl.

| | |
|---|---|
| ***B62D 55/14*** | (2006.01) |
| ***B62D 55/04*** | (2006.01) |
| ***B62D 55/084*** | (2006.01) |
| ***B62D 55/125*** | (2006.01) |

(52) U.S. Cl.

CPC ........... *B62D 55/04* (2013.01); *B62D 55/084* (2013.01); *B62D 55/125* (2013.01); *B62D 55/14* (2013.01)

(58) Field of Classification Search

CPC .... B62D 55/04; B62D 55/084; B62D 55/125; B62D 55/14

USPC ........................................................ 180/9.21

See application file for complete search history.

(56) References Cited

U.S. PATENT DOCUMENTS

| | | | | |
|---|---|---|---|---|
| 5,456,331 | A * | 10/1995 | Gustin | B62D 55/14 180/9.1 |
| 6,401,847 | B1 * | 6/2002 | Lykken | B62D 55/30 180/9.1 |
| 7,128,176 | B1 * | 10/2006 | Mills | B62M 27/02 305/167 |
| 10,099,733 | B1 * | 10/2018 | Sewell | B62D 55/22 |
| 10,351,186 | B1 * | 7/2019 | Fischer | B62D 55/21 |
| 2006/0207819 | A1 * | 9/2006 | Boisvert | B62D 55/104 180/190 |
| 2017/0166271 | A1 * | 6/2017 | Hakes | B62D 55/26 |
| 2019/0176914 | A1 * | 6/2019 | Boivin | B62D 55/04 |

FOREIGN PATENT DOCUMENTS

| | | | | |
|---|---|---|---|---|
| EP | 3508402 | A1 * | 7/2019 | B62D 55/12 |
| JP | H10316060 | A * | 12/1998 | |

OTHER PUBLICATIONS

International Searching Authority, International Search Report and Written Opinion for counterpart application PCT/US2022/046681. Mailed on Feb. 14, 2023 (15 pgs].

* cited by examiner

*Primary Examiner* — John Olszewski
*Assistant Examiner* — Nathaniel William Watkins
(74) *Attorney, Agent, or Firm* — Quarles & Brady LLP

(57) ABSTRACT

A tractive element for a power machine can include a frame, an endless track, a drive sprocket, and a first set of split rollers. The first set of rollers can include a first roller rotatably coupled to the first plate with a first axis of rotation and a second roller rotatably coupled to the second plate with a second axis of rotation. The first axis of rotation and the second axis of rotation can be spaced apart from one another with a first roller offset distance, along a front-to-back direction of the tractive element, that can provide improved ride quality.

25 Claims, 12 Drawing Sheets

ARRANGEMENTS FOR TRACTIVE ELEMENTS OF POWER MACHINES

CROSS-REFERENCE TO RELATED APPLICATIONS

This application claims priority to U.S. provisional patent application No. 63/256,336, filed Oct. 15, 2021, the entirety of which is incorporated herein by reference.

BACKGROUND

This disclosure is directed toward power machines. More particularly, this disclosure relates to arrangements for tractive elements for power machines, including endless track pods for use with a quad-track drive assembly. Power machines, for the purposes of this disclosure, include any type of machine that generates power to accomplish a particular task or a variety of tasks. One type of power machine is a work vehicle. Work vehicles are generally self-propelled vehicles that have a work device, such as a lift arm (although some work vehicles can have other work devices) that can be manipulated to perform a work function. Work vehicles include loaders, excavators, utility vehicles, tractors including compact tractors, and trenchers, to name a few examples. Other types of power machines can include mini-loaders (e.g., mini track loaders), and mowers.

Power machines can include a variety of tractive elements to propel the power machine across a variety of terrain or other support surfaces. For example, some power machines may include a dual-track drive assembly (or tractive assembly) having a single ground engaging endless track on each lateral side of the power machine, while other power machines may include wheeled drive assemblies with four ground-engaging wheels. Still other power machines may include a quad-track drive assembly having four ground-engaging endless track pods. The relative utility of the various drive assemblies may vary depending on the type of terrain or support surface, the type of power machine, the operator, aspects of the configuration of the relevant power machine, the operations to be executed, and various other factors. Additionally, the type of tractive elements used can affect various operational characteristics of the power machine, for example, maneuverability and ride quality.

The discussion above is merely provided for general background information and is not intended to be used as an aid in determining the scope of the claimed subject matter.

SUMMARY

Examples of the disclosed subject matter can allow for improved ride quality for power machines using drive assemblies having endless tracks, in particular, quad-track drive assemblies, by providing improved roller configurations.

Some examples provide a tractive element for a power machine. The tractive element can include a frame, and endless track, a drive sprocket and a first set of split rollers. The frame can include a first support plate spaced in a lateral direction from a second support plate. The endless track can surround and be supported by the frame. The endless track can include a plurality of embeds evenly spaced apart that define a pitch of the endless track. The drive sprocket can be rotatably coupled to the frame to engage and rotate the endless track. The first set of split rollers can include a first roller rotatably coupled to the first support plate with a first axis of rotation and a second roller rotatably coupled to the second support plate with a second axis of rotation. The first axis of rotation and the second axis of rotation can be spaced apart from one another along a front-to-back direction of the tractive element to define a first roller offset distance. A ratio of the first roller offset distance to the pitch can be not a multiple of 0.5.

In some examples, the first roller can be cantilevered from the first support plate by a first axle that defines the first axis of rotation and the second roller can be cantilevered from the second support plate by a second axle that defines the second axis of rotation.

In some examples, the ratio of the first roller offset distance to the pitch can be greater than 0.5 and less than 1.0.

In some examples, the ratio of the first roller offset distance to the pitch can be greater than 0.5 and less than 0.8.

In some examples, the ratio of the first roller offset distance to the pitch can be greater than 0.5 and less than 0.6.

In some examples, the first support plate can include a first exterior plate and a first interior plate that can be between the first roller and the first exterior plate, relative to the lateral direction; and In some examples, the second support plate can include a second exterior plate and a second interior plate that is between the second roller and the second exterior plate, relative to the lateral direction.

In some examples, the first roller can be cantilevered from the first exterior plate by a first axle that defines the first axis of rotation and the second roller can be cantilevered from the second exterior plate by a second axle that defines the second axis of rotation.

In some examples, the first interior plate can include a first cutout that receives the first roller, and the second interior plate can include a second cutout that receives the second roller.

In some examples, a plurality of anti-rotation stop features on the first support and second support plates can be symmetrically arranged relative to a reference line that is perpendicular to the front-to-back direction and the lateral direction and extends through the drive sprocket.

In some examples, the tractive element can include a second set of split rollers including a third roller rotatably coupled to the first support plate with a third axis of rotation and a fourth roller rotatably coupled to the second support plate with a fourth axis of rotation. The third axis of rotation and the fourth axis of rotation can be spaced apart from one another along the front-to-back direction of the tractive element to define a second roller offset distance. The first, second, third, and fourth axes of rotation can be arranged along the front-to-back direction with the first axis of rotation closest to a first end of the tractive element, the fourth axis of rotation closest to a second end of the tractive element that can be opposite the first end, the second axis of rotation between the first and fourth axes of rotation, and the third axis of rotation between the second and fourth axes of rotation.

In some examples, a plurality mounting locations for the sets of split rollers on the first and second support plates are symmetrically arranged relative to a reference line that can be perpendicular to the front-to-back direction and the lateral direction.

In some examples, the second roller offset distance can be equal to the first roller offset distance.

In some examples, the first, second, third, and fourth axes of rotation can be collectively symmetrically spaced relative to a reference line on the tractive element that is perpendicular to the front-to-back direction and the lateral direction, with the first and second axes of rotation on a first side of the reference line and the third and fourth axes of rotation on a second side of the reference line that is opposite the first side. In some examples, the reference line can correspond to a drive axis defined by the drive sprocket.

In some examples, the tractive element can be a quad-track assembly configured to be selectively installed at any of a front-right, front-left, rear-right, and rear-left position on the power machine.

In some examples, the first axis of rotation and the third axis of rotation can be spaced apart from each other along the front-to-back direction to define a third roller offset distance. A ratio of the third roller offset distance to the pitch can be greater than 2.0 and less than 2.5.

In some examples, the second axis of rotation and the fourth axis of rotation are spaced apart from each other along the front-to-back direction to define a fourth roller offset distance. A ratio of the fourth roller offset distance to the pitch can be greater than 2.0 and less than 2.5.

In some examples, the first axis of rotation and the fourth axis of rotation can be spaced apart from each other along the front-to-back direction to define an outside roller offset distance. A ratio of the outside roller offset distance to the pitch can be greater than 2.5 and less than 3.0.

In some examples, the second axis of rotation and the third axis of rotation can be spaced apart from each other along the front-to-back direction to define an inside roller offset distance. A ratio of the inside roller offset distance to the pitch can be greater than 1.0 and less than 1.5.

Some examples can provide a power machine that includes a power machine frame that supports a work element, an axle assembly, and a quad-track arrangement. The axle assembly can include: first front axle extending outwardly from a first side of the power machine frame, proximate a front of the power machine frame; a second front axle extending outwardly from a second side of the power machine frame, proximate the front of the power machine frame; a first rear axle extending outwardly from the first side of the power machine frame, proximate a rear of the power machine frame; and a second rear axle extending outwardly from the second side of the power machine frame, proximate the rear of the power machine frame. The quad-track arrangement can include: a first tractive element operatively coupled to the first front axle; a second tractive element operatively coupled to the second front axle; a third tractive element operatively coupled to the first rear axle; and a fourth tractive element operatively coupled to the second rear axle.

In some examples, at least one of the first, second, third, and fourth tractive elements can include: a track frame having a first support plate spaced apart from a second support plate; an endless track surrounding and supported by the track frame, the endless track including a plurality of embeds that define a pitch; a drive sprocket rotatably coupled to the track frame, the drive sprocket being engaged with the embeds to rotate the endless track around the track frame; and a set of rollers. The set of rollers can include: a first roller rotatably coupled to the first support plate with a first axis of rotation, a second roller rotatably coupled to the second support plate with a second axis of rotation, a third roller rotatably coupled to the first plate with a third axis of rotation, and a fourth roller rotatably coupled to the second plate with a fourth axis of rotation. A spacing between the first and second axes of rotation can be greater than 0.5 times the pitch and less than 0.7 times the pitch. A spacing between the third and fourth axes of rotation can be greater than 0.5 times the pitch and less than 0.7 times the pitch In some examples, a spacing between the first and third axes of rotation can be greater than 2.0 times the pitch and less than 2.2 times the pitch. A spacing between the second and fourth axes of rotation can be greater than 2.0 times the pitch and less than 2.2 times the pitch. A spacing between the first and fourth axes of rotation can be greater than 2.5 times the pitch and less than 2.7 times the pitch. A spacing between the second and third axes of rotation can be greater than 1.3 times the pitch and less than 1.5 times the pitch.

In some examples, any one of the first, second, third, and fourth tractive elements can be selectively (and interchangeably) installed at any of the first front, second front, first rear, and second rear axles.

In some examples, each of the first, second, third, and fourth tractive elements can be operatively couplable to any of the first front, second front, first rear, and second rear axles.

In some examples, each of the first, second, third, and fourth tractive elements can include, respectively: a track frame having a first support plate spaced apart from a second support plate; an endless track surrounding and supported by the track frame, the endless track including a plurality of embeds that define a pitch; a drive sprocket rotatably coupled to the track frame, the drive sprocket being engaged with the embeds to rotate the endless track around the track frame; and a set of rollers. The set of rollers can include a first roller rotatably coupled to the first support plate with a first axis of rotation, a second roller rotatably coupled to the second support plate with a second axis of rotation, a third roller rotatably coupled to the first plate with a third axis of rotation, and a fourth roller rotatably coupled to the second plate with a fourth axis of rotation.

In some examples, for each of the first, second, third, and fourth tractive elements, when the tractive element is mounted to any of the first front, second front, first rear, or second rear axles, the first set of rollers can be symmetrical to the second set of rollers, about a plane corresponding to a pivot axis of the tractive element relative to the power machine frame.

In some examples, for each of the first, second, third, and fourth tractive elements, when the tractive element is mounted to any of the first front, second front, first rear, or second rear axles, a first anti-rotation stop on the tractive element can be symmetrical to a second anti-rotation stop on the tractive element, about the plane corresponding the pivot axis of the tractive element relative to the power machine frame.

Some examples can provide a power machine that includes a power machine frame, a work element, a power source, and a tractive element. The power machine frame can support an operator station. The work element can be operably coupled to the power machine frame. The power source can be supported by the power machine frame and configured to power movement of the work element. The tractive element can be secured to the power machine frame and configured to be powered by the power source to provide tractive force for the power machine. The tractive element can include: a track frame having a first support plate spaced from a second support plate; an endless track surrounding and being supported by the track frame; a drive sprocket rotatably coupled to the track frame, the drive sprocket being configured to engage and rotate the endless track; and a first set of split rollers. The first set of split rollers can include a first roller rotatably coupled to the first support plate with a first axis of rotation and a second roller rotatably coupled to the second support plate with a second axis of rotation.

In some examples, the first axis of rotation and the second axis of rotation can be spaced apart along a front-to-back direction of the tractive element to define a first roller offset distance.

In some examples, the endless track can be a rubber endless track having a plurality of evenly spaced embeds that define a pitch of the endless track. A ratio of the first roller offset distance to the pitch can be not a multiple of 0.5.

In some examples, the endless track can be a metal endless track.

In some examples, the tractive element further can include a second set of split rollers, including a third roller rotatably coupled to the first support plate with a third axis of rotation and a fourth roller rotatably coupled to the second support plate with a fourth axis of rotation. The third axis of rotation and the fourth axis of rotation can be spaced apart from one another along a front-to-back direction of the tractive element to define a second roller offset distance.

In some examples, bodies of adjacent sets of the first, second, third, fourth rollers overlap along a front-to-back direction.

This Summary and the Abstract are provided to introduce a selection of concepts in a simplified form that are further described below in the Detailed Description. This Summary is not intended to identify key features or essential features of the claimed subject matter, nor are they intended to be used as an aid in determining the scope of the claimed subject matter.

DRAWINGS

The following drawings are provided to help illustrate various features of non-limiting examples of the disclosure and are not intended to limit the scope of the disclosure or exclude alternative implementations.

DETAILED DESCRIPTION

Figure 1:
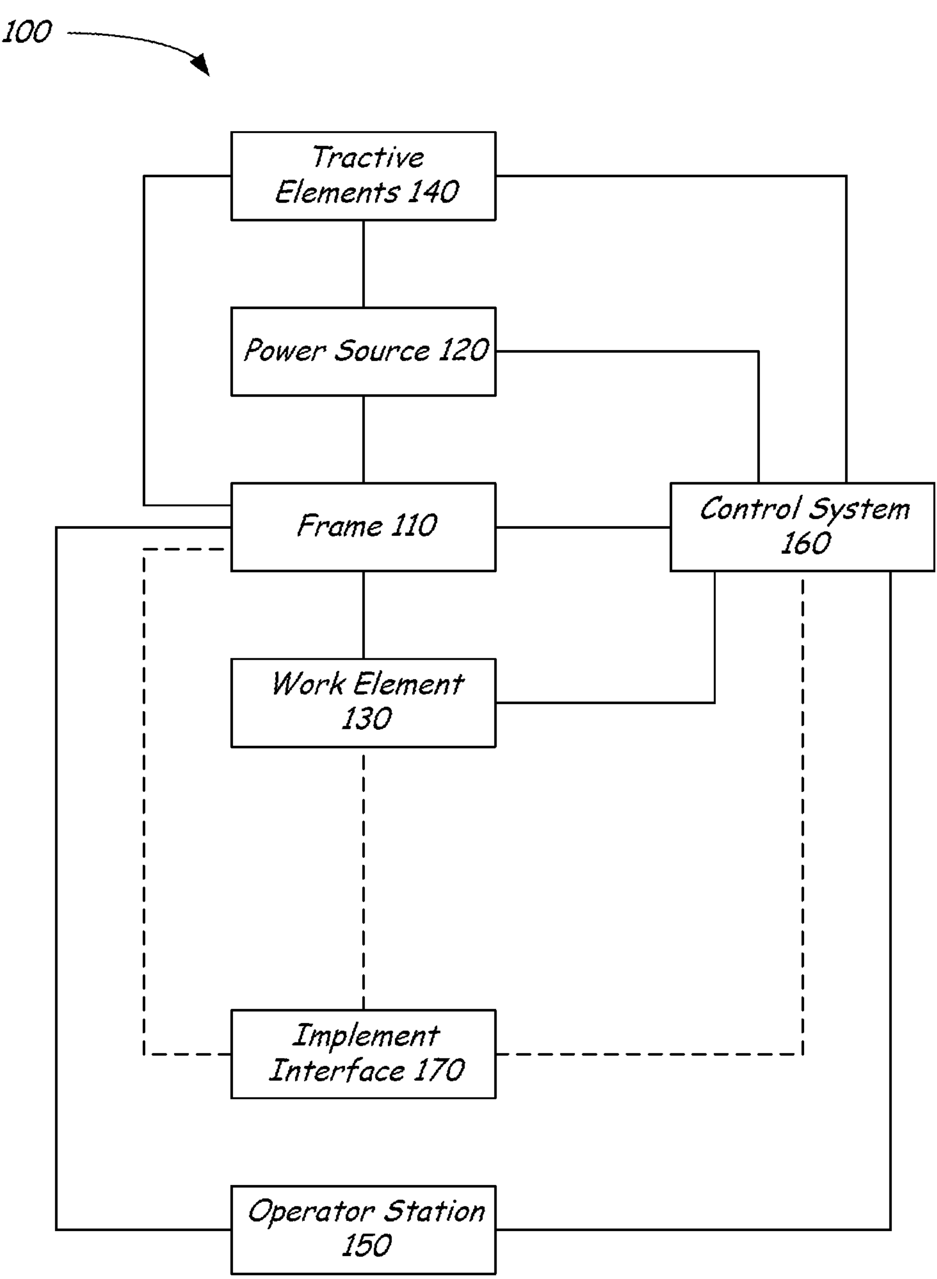
FIG. 1 is a block diagram illustrating functional systems of a representative power machine on which examples of the present disclosure can be advantageously practiced.

The concepts disclosed in this discussion are described and illustrated by referring to exemplary configurations. These concepts, however, are not limited in their application to the details of construction and the arrangement of components in the illustrative examples and are capable of being practiced or being carried out in various other ways. The terminology in this document is used for the purpose of description and should not be regarded as limiting. Words such as “including,” “comprising,” and “having” and variations thereof as used herein are meant to encompass the items listed thereafter, equivalents thereof, as well as additional items.

As used herein, unless otherwise limited or defined, “substantially identical” refers to two or more components or systems that are manufactured or used according to the same process and specification, with variation between the components or systems that are within the limitations of acceptable tolerances for the relevant process and specification. For example, two components can be considered to be substantially identical if the components are manufactured according to the same standardized manufacturing steps, with the same materials, and within the same acceptable dimensional tolerances (e.g., as specified for a particular process or product).

Also as used herein, unless otherwise limited or defined, “or” indicates a non-exclusive list of components or operations that can be present in any variety of combinations, rather than an exclusive list of components that can be present only as alternatives to each other. For example, a list of “A, B, or C” indicates options of: A; B; C; A and B; A and C; B and C; and A, B, and C. Correspondingly, the term “or” as used herein is intended to indicate exclusive alternatives only when preceded by terms of exclusivity, such as “either,” “one of,” “only one of,” or “exactly one of.” For example, a list of “one of A, B, or C” indicates options of: A, but not B and C; B, but not A and C; and C, but not A and B. A list preceded by “one or more” (and variations thereon) and including “or” to separate listed elements indicates options of one or more of any or all of the listed elements. For example, the phrases “one or more of A, B, or C” and “at least one of A, B, or C” indicate options of: one or more A; one or more B; one or more C; one or more A and one or more B; one or more B and one or more C; one or more A and one or more C; and one or more of A, one or more of B, and one or more of C. Similarly, a list preceded by “a plurality of” (and variations thereon) and including “or” to separate listed elements indicates options of multiple instances of any or all of the listed elements. For example, the phrases “a plurality of A, B, or C” and “two or more of A, B, or C” indicate options of: A and B; B and C; A and C; and A, B, and C.

As used herein in the context of a power machine, unless otherwise defined or limited, the term “lateral” refers to a direction that extends at least partly to a left or a right side of a front-to-back reference line defined by the power machine. Accordingly, for example, a lateral side wall of a cab of a power machine can be a left side wall or a right side wall of the cab, relative to a frame of reference of an operator who is within the cab or is otherwise oriented to operatively engage with controls of an operator station of the cab. Similarly, a “centerline” of a power machine refers to a reference line that extends in a front-to-back direction of a power machine, approximately half-way between opposing lateral sides of an outer spatial envelope of the power machine. Also as used herein, the terms "about" and "approximately" mean plus or minus 5% of the number that each term precedes, unless otherwise specified.

Relatedly, as used herein, unless otherwise defined or limited, the terms "inboard" and "outboard" refer to a relative relationship (e.g., a lateral distance) between one or more objects or structures and a centerline of the power machine, along a lateral side of the power machine. For example, a first structure that is inboard of a second structure is positioned laterally inward from the second structure so that a distance between the first structure and the centerline of the power machine is less than a distance between the second structure and the centerline of the power machine. Conversely, a first structure that is outboard of second structure is positioned laterally outward from the second structure so that a distance between the first structure and the centerline of the power machine is greater than a distance between the second structure and the centerline of the power machine.

Similarly, as used herein, unless otherwise defined or limited, the terms "interior" and "exterior" refers to a relative relationship (e.g., a lateral distance) between one or more structures (e.g., a sub-structure) and a centerline of a reference structure (e.g., a main structure) that extends in a front-to-back direction or between first and second ends of the reference structure. For example, an interior structure is disposed closer to a centerline of a reference structure than an exterior structure. In this regard, an outboard structure of a subassembly of a power machine may also be an exterior structure, but an exterior structure of a subassembly, relative to a centerline of the subassembly, may not necessarily be outboard of other components of the subassembly.

With conventional designs, tractive elements for a power machine can be configured as endless tracks (e.g., either dual-tracks or quad-tracks) that include a track frame that supports and is surrounded by an endless track. A track frame generally includes an inboard plate and outboard plate that together support a plurality of rollers. More specifically, each of the plurality of rollers can be supported by an axle that extends between the inboard plate and the outboard plate of the track frame. The plurality of rollers can be spaced apart along a front-to-back direction of the track frame and can engage an interior surface of the endless track to support and distribute the weight of the power machine on a support surface through the endless track.

Rubber endless tracks typically include embeds, which are equally-spaced, laterally extending metal reinforcements that are positioned within the rubber track to provide additional strength and rigidity to the endless track. As the rollers move over embeds, the rollers can, in some cases, drop at least partially into the gaps between adjacent embeds, and this drop can result in vibrations that are transmitted to an operator. Such embeds usually include an inward projection configured to engage sprocket teeth to help move the endless rubber track about the track frame when the sprocket is rotating.

The technology disclosed herein can address these and other issues. For example, some implementations can provide for an improved roller arrangement for an endless track pod of a quad-track drive assembly that can reduce the amount of vibration transmitted to an operator. In particular, in some examples, an endless track pod can include a track frame that is configured to support one or more sets of split rollers to distribute the locations and load-bearing timing of rollers more effectively and thereby reduce the amount of vibration transmitted to an operator. As used herein, a set of split rollers designates one or more rollers that are supported on only side relative to a support frame (e.g., supported relative to a plate of a track frame on a cantilevered axle). With two sets of two split rollers, for example, some quad-track assemblies can effectively double the number of discrete timings for contact between the rollers and any given set of embeds of an endless track. Further, with appropriate spacing (e.g., also in combination with a split roller configuration), the timings for contacts between rollers and embeds can be improved relative to existing designs. This can provide improved ride conditions for operators, including by way of appropriately desynchronizing contacts between different sets of embeds and rollers. Correspondingly, use of split rollers in some cases can complement particular roller spacing to provide improved contact patterns with an endless track and corresponding improvements in efficiency and comfort for power machine operations.

More specifically, in some examples, a track frame can be configured to support one or more sets of split rollers. Each set of these split rollers includes an inboard roller supported by an inboard plate of the track frame and an opposing outboard roller supported by an outboard plate of the track frame. The inboard roller can be cantilevered from the inboard plate via an inboard roller axle and the outboard roller is cantilevered from the outboard plate via an outboard roller axle. Accordingly, the inboard roller and the outboard roller are separate from one another so that they can rotate independently.

In some examples, an endless track pod can include one or more sets of split rollers, with each set having an inboard roller and an outboard roller that are spaced apart from one another along a front-to-back direction of the endless track pod. For example, each set of split rollers can include an inboard roller and an outboard roller that are longitudinally offset along a centerline of the track pod from one another so that the inboard roller is disposed closer to a particular end of a track pod than the outboard roller, or vice versa. That is, an axis of rotation of the inboard roller, defined by an inboard roller axle, can be disposed closer to and end of the endless track pod than an axis of rotation of the outboard roller, defined by an outboard roller axle (or vice versa). Accordingly, each set of split rollers can define a roller or axial offset distance between the axis of rotation of the inboard roller and the axis of rotation of the outboard roller. In some cases, where multiple sets of split rollers are provided, some or all of the sets of split rollers can have the same roller offset distances. In some cases, different subsets of rollers among a plurality of split rollers can be provided with particular optimized offset distances, and combinations of offset distances, including as further detailed below.

In some examples, a set of split rollers can be spaced apart by a roller offset distance so that an inboard roller and an outboard roller are out of time (i.e., not in phase, or otherwise desynchronized) with respect to the embeds of a corresponding endless track. In that regard, the rollers can be spaced so that each roller contacts the embeds at a different time, reducing the vibrations resulting from such contact. In cases where two or more sets of split rollers are present, the rollers of each split roller and the rollers of the split rollers in combination can be spaced to be out of time with the embeds of an endless track.

As one example, a set of split rollers can define a roller offset distance between an axis of rotation of an inboard (or outboard) roller and an axis of rotation of an outboard (or inboard) roller, and the embeds of a corresponding endless track can define a pitch (i.e., a center-to-center distance between adjacent embeds). In some examples, a ratio of the roller offset distance of the set of split rollers to the pitch of the embeds can be not equal to 0.5 or any multiple thereof (e.g., 0, 1.0, 1.5, 2.0, etc.). Rather, the ratio of the roller offset distance to the pitch can range between 0 and 0.5, 0.5 and 1.0, 1.0 and 1.5, and so on, not including the various endpoints. In a preferred example, the ratio of the roller offset distance to the pitch may range from greater than 0.5 to less than 0.8, or from greater than 0.5 to less than 0.6.

In some examples, a track pod may include two or more sets of split rollers that can be symmetrically spaced about a drive or pivot axis of the endless track pod. For example, a track pod can include a first set of split rollers and a second set of split rollers, the rotational axes of which are disposed on opposing sides of a vertical plane passing through a drive or pivot axis defined by a drive sprocket or a power machine axle (or another pivot point). In some cases, the two sets of split rollers can be arranged so that the respective rollers are collectively symmetrically spaced along a front-to back direction from the vertical plane. That is, the distance between a first axis of rotation of a first inboard roller and a second axis of rotation of a first outboard roller of the first set of split rollers can be equal to the distance between a third axis of rotation of a second inboard roller and a fourth axis of rotation of a second outboard roller of the second set of split rollers, and the distances of the first and second axes of rotation of the first set of split rollers from the vertical plane can be equal to the distances of the third and fourth axes of rotation of the second set of split rollers. In some cases, the rollers can be arranged so that the first and the fourth axes of rotation can be equidistant from the drive axis and the second and third axes of rotation can be equidistant from the drive axis—i.e., the first and second sets of rollers may be symmetrical relative to the drive axis, with the first and third axes of rotation equidistant from the drive axis and the second and fourth axes of rotation equidistant from the drive axis.

In some cases, each of the axes of rotation of inboard (or outboard) rollers of multiple sets of split rollers may be disposed closer to a corresponding end of the endless track pod than the axes of rotation of outboard (or inboard) rollers of the multiple sets of split rollers. As noted above, in some such cases the respective roller offset distances between the rollers of each split roller set may be the same. In some cases, however, first and second sets of split rollers can exhibit the same internal spacing but may not necessarily be equally spaced from a drive or pivot axis of a track pod.

In some examples, an endless track pod can be rotatably coupled to an axle of a power machine and can include an anti-rotation bracket that is configured to limit the rotation of the endless track pod with respect to the power machine. For example, an endless track pod can include an anti-rotation bracket that is supported on an inboard side of a track frame by an axle (e.g., an axle tube) of a power machine. The anti-rotation bracket can define a surface that is configured to engage with one or more anti-rotation pins extending from an inboard plate of the track frame and toward a main frame of power machine. Accordingly, the anti-rotation bracket can act as physical limit stop that limits rotation of the endless track pod in both directions. In some cases, the anti-rotation bracket and the anti-rotation pins can be symmetrically arranged about a drive axis (e.g., to allow the endless track pod to rotate between 10 and 30 degrees in either direction, or to about 15 degrees in either direction). In some cases, to prevent an anti-rotation bracket from rotating about an axle, the anti-rotation bracket may be coupled to another anti-rotation bracket of another endless track pod by a brace or beam.

In some examples, an endless track pod can be otherwise symmetrically arranged. For example, mounting locations for split rollers that define rotational axes for the rollers can be symmetrically arranged relative to a drive or pivot axis of a track pod, so that the track pod can be selectively installed at any of four tractive interfaces (e.g., axle hubs) of a power machine. In other words, in some examples, a particular track pod assembly according to the disclosed technology can be selectively installed for use as any of the required tractive assemblies of a quad-track power machine (e.g., any of four track pod assemblies, in a typical quad-track configuration), with no changes required for the track pod assembly other than to move the assembly into alignment with the relevant location (e.g., to be secured to any selected one of four axle tubes). In contrast, conventional designs often require a particular track pod to be installed only at a particular axle hub. In some examples, other features can also be symmetrical in this regard, including mounting locations for idlers, pins, or other features to engage an anti-rotation stop, etc.

Figure 2:
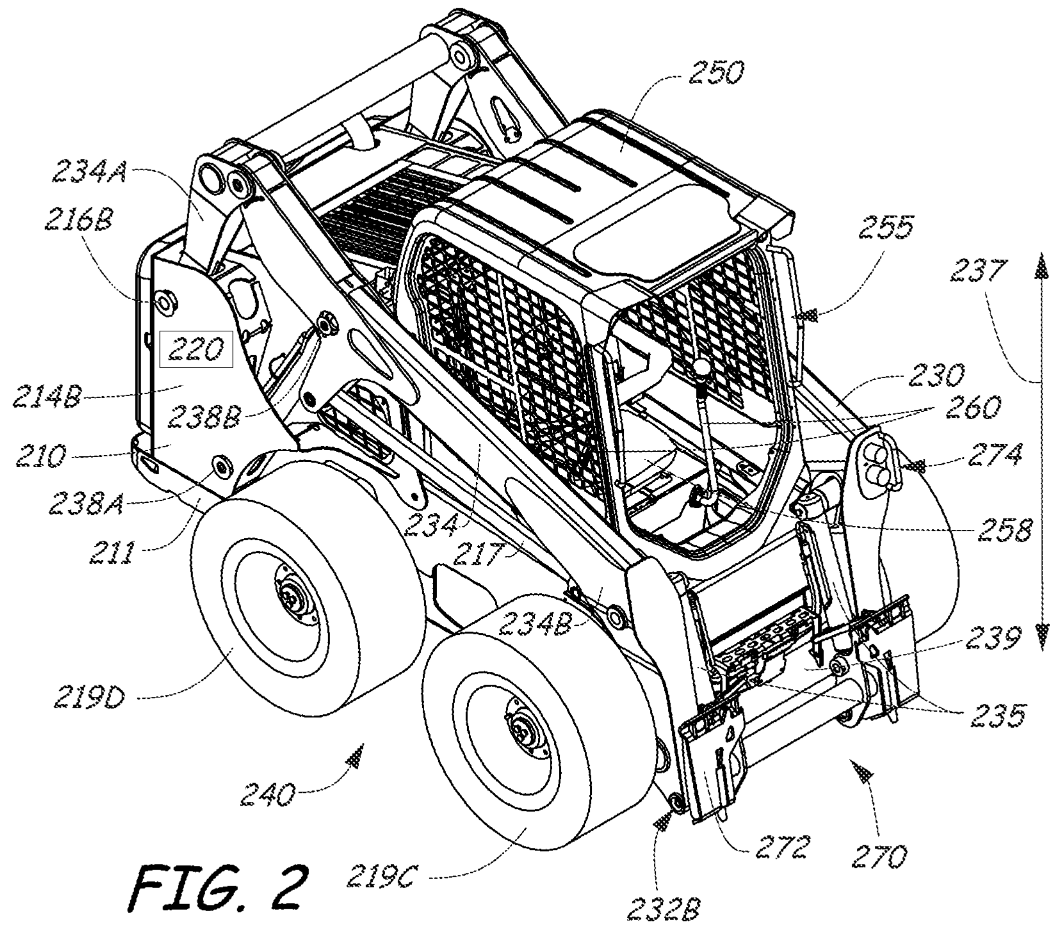
FIGS. 2-3 illustrate perspective views of a representative power machine in the form of a skid-steer loader of the type on which the disclosed technology can be practiced.
Figure 3:
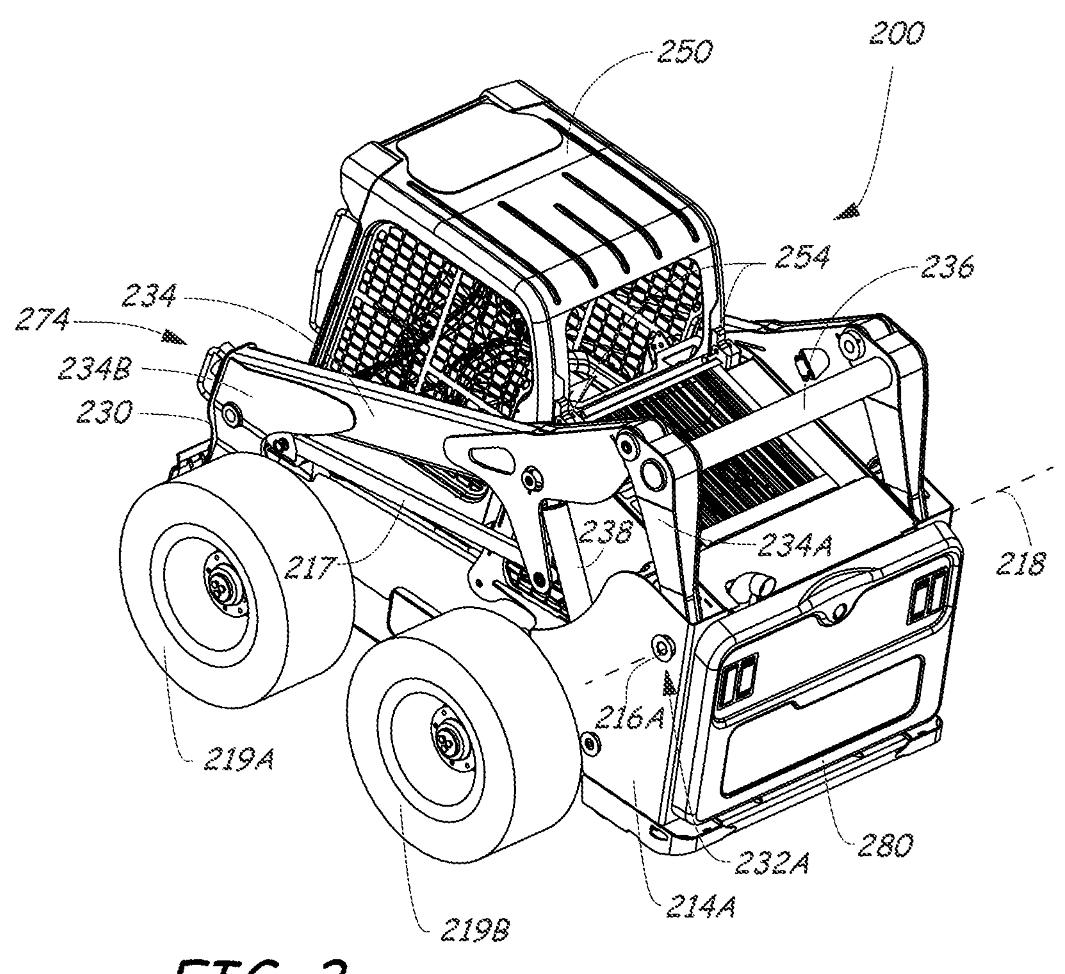

These concepts can be practiced on various power machines, as will be described below. A representative power machine on which the disclosed technology can be practiced is illustrated in diagram form in FIG. 1 and one example of such a power machine is illustrated in FIGS. 2-3 and described below before any examples are disclosed. For the sake of brevity, only one power machine is illustrated and discussed as being a representative power machine. However, as mentioned above, the examples below can be practiced on any of a number of power machines, including power machines of different types from the representative power machine shown in FIGS. 2-3. Power machines, for the purposes of this discussion, include a frame, at least one work element, and a power source that can provide power to the work element to accomplish a work task. One type of power machine is a self-propelled work vehicle. Self-propelled work vehicles are a class of power machines that include a frame, work element, and a power source that can provide power to the work element. At least one of the work elements is a motive system for moving the power machine under power.

FIG. 1 is a block diagram that illustrates the basic systems of a power machine 100, which can be any of a number of different types of power machines, upon which the examples discussed below can be advantageously incorporated. The block diagram of FIG. 1 identifies various systems on power machine 100 and the relationship between various components and systems. As mentioned above, at the most basic level, power machines for the purposes of this discussion include a frame, a power source, and a work element. The power machine 100 has a frame 110, a power source 120, and a work element 130. Because power machine 100 shown in FIG. 1 is a self-propelled work vehicle, it also has tractive elements 140, which are themselves work elements provided to move the power machine over a support surface and an operator station 150 that provides an operating position for controlling the work elements of the power machine. A control system 160 is provided to interact with the other systems to perform various work tasks at least in part in response to control signals provided by an operator.

Certain work vehicles have work elements that can perform a dedicated task. For example, some work vehicles have a lift arm to which an implement such as a bucket is attached such as by a pinning arrangement. The work element, i.e., the lift arm can be manipulated to position the implement to perform the task. The implement, in some instances can be positioned relative to the work element, such as by rotating a bucket relative to a lift arm, to further position the implement. Under normal operation of such a work vehicle, the bucket is intended to be attached and under use. Such work vehicles may be able to accept other implements by disassembling the implement/work element combination and reassembling another implement in place of the original bucket. Other work vehicles, however, are intended to be used with a wide variety of implements and have an implement interface such as implement interface 170 shown in FIG. 1. At its most basic, implement interface 170 is a connection mechanism between the frame 110 or a work element 130 and an implement, which can be as simple as a connection point for attaching an implement directly to the frame 110 or a work element 130 or more complex, as discussed below.

On some power machines, implement interface 170 can include an implement carrier, which is a physical structure movably attached to a work element. The implement carrier has engagement features and locking features to accept and secure any of a number of different implements to the work element. One characteristic of such an implement carrier is that once an implement is attached to it, it is fixed to the implement (i.e., not movable with respect to the implement) and when the implement carrier is moved with respect to the work element, the implement moves with the implement carrier. The term implement carrier as used herein is not merely a pivotal connection point, but rather a dedicated device specifically intended to accept and be secured to various different implements. The implement carrier itself is mountable to a work element 130 such as a lift arm or the frame 110. Implement interface 170 can also include one or more power sources for providing power to one or more work elements on an implement. Some power machines can have a plurality of work element with implement interfaces, each of which may, but need not, have an implement carrier for receiving implements. Some other power machines can have a work element with a plurality of implement interfaces so that a single work element can accept a plurality of implements simultaneously. Each of these implement interfaces can, but need not, have an implement carrier.

Frame 110 includes a physical structure that can support various other components that are attached thereto or positioned thereon. The frame 110 can include any number of individual components. Some power machines have frames that are rigid. That is, no part of the frame is movable with respect to another part of the frame. Other power machines have at least one portion that can move with respect to another portion of the frame. For example, excavators can have an upper frame portion that rotates with respect to a lower frame portion. Other work vehicles have articulated frames such that one portion of the frame pivots with respect to another portion for accomplishing steering functions.

Frame 110 supports the power source 120, which is configured to provide power to one or more work elements 130 including the one or more tractive elements 140, as well as, in some instances, providing power for use by an attached implement via implement interface 170. Power from the power source 120 can be provided directly to any of the work elements 130, tractive elements 140, and implement interfaces 170. Alternatively, power from the power source 120 can be provided to a control system 160, which in turn selectively provides power to the elements that capable of using it to perform a work function. Power sources for power machines typically include an engine such as an internal combustion engine and a power conversion system such as a mechanical transmission or a hydraulic system that is configured to convert the output from an engine into a form of power that is usable by a work element. Other types of power sources can be incorporated into power machines, including electrical sources or a combination of power sources, known generally as hybrid power sources.

FIG. 1 shows a single work element designated as work element 130, but various power machines can have any number of work elements. Work elements are typically attached to the frame of the power machine and movable with respect to the frame when performing a work task. For example, the power machine can be a mower with a mower deck or other mower component as a work element, which may be movable with respect to the frame of the mower. In addition, tractive elements 140 are a special case of work element in that their work function is generally to move the power machine 100 over a support surface. Tractive elements 140 are shown separate from the work element 130 because many power machines have additional work elements besides tractive elements, although that is not always the case. Power machines can have any number of tractive elements, some or all of which can receive power from the power source 120 to propel the power machine 100. Tractive elements can be, for example, track assemblies, wheels attached to an axle, and the like. Tractive elements can be mounted to the frame such that movement of the tractive element is limited to rotation about an axle (so that steering is accomplished by a skidding action) or, alternatively, pivotally mounted to the frame to accomplish steering by pivoting the tractive element with respect to the frame.

Power machine 100 includes an operator station 150 that includes an operating position from which an operator can control operation of the power machine. In some power machines, the operator station 150 is defined by an enclosed or partially enclosed cab. Some power machines on which the disclosed technology may be practiced may not have a cab or an operator compartment of the type described above. For example, a walk behind loader may not have a cab or an operator compartment, but rather an operating position that serves as an operator station from which the power machine is properly operated. More broadly, power machines other than work vehicles may have operator stations that are not necessarily similar to the operating positions and operator compartments referenced above. Further, some power machines such as power machine 100 and others, whether or not they have operator compartments or operator positions, may be capable of being operated remotely (i.e., from a remotely located operator station) instead of or in addition to an operator station adjacent or on the power machine. This can include applications where at least some of the operator-controlled functions of the power machine can be operated from an operating position associated with an implement that is coupled to the power machine. Alternatively, with some power machines, a remote-control device can be provided (i.e., remote from both of the power machine and any implement to which is it coupled) that is capable of controlling at least some of the operator-controlled functions on the power machine.

FIGS. 2-3 illustrate a loader 200, which is one particular example of a power machine of the type illustrated in FIG. 1 where the examples discussed below can be advantageously employed. Loader 200 is a skid-steer loader, which is a loader that has tractive elements (in this case, four wheels) that are mounted to the frame of the loader via rigid axles. Here the phrase “rigid axles” refers to the fact that the skid-steer loader 200 does not have any tractive elements that can be rotated or steered to help the loader accomplish a turn. Instead, a skid-steer loader has a drive system that independently powers one or more tractive elements on each side of the loader so that by providing differing tractive signals to each side, the machine will tend to skid over a support surface. These varying signals can even include powering tractive element(s) on one side of the loader to move the loader in a forward direction and powering tractive element(s) on another side of the loader to mode the loader in a reverse direction so that the loader will turn about a radius centered within the footprint of the loader itself. The term "skid-steer" has traditionally referred to loaders that have skid steering as described above with wheels as tractive elements. However, it should be noted that many track loaders also accomplish turns via skidding and are technically skid-steer loaders, even though they do not have wheels. For the purposes of this discussion, unless noted otherwise, the term skid-steer should not be seen as limiting the scope of the discussion to those loaders with wheels as tractive elements. Correspondingly, although some example power machines discussed herein are presented as skid-steer power machines, some examples disclosed herein can be implemented on a variety of other power machines. For example, some configurations can be implemented on compact loaders or compact excavators that do not accomplish turns via skidding.

Loader 200 is one particular example of the power machine 100 illustrated broadly in FIG. 1 and discussed above. To that end, features of loader 200 described below include reference numbers that are generally similar to those used in FIG. 1. For example, loader 200 is described as having a frame 210, just as power machine 100 has a frame 110. Skid-steer loader 200 is described herein to provide a reference for understanding one environment on which the examples described below related to track assemblies and mounting elements for mounting the track assemblies to a power machine may be practiced. The loader 200 should not be considered limiting especially as to the description of features that loader 200 may have described herein that are not essential to the disclosed technology and thus may or may not be included in power machines other than loader 200 upon which the examples disclosed below may be advantageously practiced. Unless specifically noted otherwise, examples disclosed below can be practiced on a variety of power machines, with the loader 200 being only one of those power machines. For example, some or all of the concepts discussed below can be practiced on many other types of work vehicles such as various other loaders, excavators, trenchers, and dozers, to name but a few examples.

Loader 200 includes frame 210 that supports a power system 220, the power system being capable of generating or otherwise providing power for operating various functions on the power machine. Power system 220 is shown in block diagram form but is located within the frame 210. Frame 210 also supports a work element in the form of a lift arm assembly 230 that is powered by the power system 220 and that can perform various work tasks. As loader 200 is a work vehicle, frame 210 also supports a traction system 240, which is also powered by power system 220 and can propel the power machine over a support surface. The lift arm assembly 230 in turn supports an implement interface 270, which includes an implement carrier 272 that can receive and secure various implements to the loader 200 for performing various work tasks and power couplers 274, to which an implement can be coupled for selectively providing power to an implement that might be connected to the loader. Power couplers 274 can provide sources of hydraulic or electric power or both. The loader 200 includes a cab 250 that defines an operator station 255 from which an operator can manipulate various control devices 260 to cause the power machine to perform various work functions. Cab 250 can be pivoted back about an axis that extends through mounts 254 to provide access to power system components as needed for maintenance and repair.

The operator station 255 includes an operator seat 258 and a plurality of operation input devices, including control levers 260 that an operator can manipulate to control various machine functions. Operator input devices can include buttons, switches, levers, sliders, pedals and the like that can be stand-alone devices such as hand operated levers or foot pedals or incorporated into hand grips or display panels, including programmable input devices. Actuation of operator input devices can generate signals in the form of electrical signals, hydraulic signals, or mechanical signals. Signals generated in response to operator input devices are provided to various components on the power machine for controlling various functions on the power machine. Among the functions that are controlled via operator input devices on power machine 200 include control of the tractive elements 219, the lift arm assembly 230, the implement carrier 272, and providing signals to any implement that may be operably coupled to the implement.

Loaders can include human-machine interfaces including display devices that are provided in the cab 250 to give indications of information relatable to the operation of the power machines in a form that can be sensed by an operator, such as, for example audible/or visual indications. Audible indications can be made in the form of buzzers, bells, and the like or via verbal communication. Visual indications can be made in the form of graphs, lights, icons, gauges, alphanumeric characters, and the like. Displays can provide dedicated indications, such as warning lights or gauges, or dynamic to provide programmable information, including programmable display devices such as monitors of various sizes and capabilities. Display devices can provide diagnostic information, troubleshooting information, instructional information, and various other types of information that assists an operator with operation of the power machine or an implement coupled to the power machine. Other information that may be useful for an operator can also be provided. Other power machines, such walk behind loaders may not have a cab nor an operator compartment, nor a seat. The operator position on such loaders is generally defined relative to a position where an operator is best suited to manipulate operator input devices.

Various power machines that can include or interacting with the examples discussed below can have various different frame components that support various work elements. The elements of frame 210 discussed herein are provided for illustrative purposes and frame 210 is not the only type of frame that a power machine on which the examples can be practiced can employ. Frame 210 of loader 200 includes an undercarriage or lower portion 211 of the frame and a mainframe or upper portion 212 of the frame that is supported by the undercarriage. The mainframe 212 of loader 200, in some examples is attached to the undercarriage 211 such as with fasteners or by welding the undercarriage to the mainframe. Alternatively, the mainframe and undercarriage can be integrally formed. Mainframe 212 includes a pair of upright portions 214A and 214B located on either side and toward the rear of the mainframe that support lift arm assembly 230 and to which the lift arm assembly 230 is pivotally attached. The lift arm assembly 230 is illustratively pinned to each of the upright portions 214A and 214B. The combination of mounting features on the upright portions 214A and 214B and the lift arm assembly 230 and mounting hardware (including pins used to pin the lift arm assembly to the mainframe 212) are collectively referred to as joints 216A and 216B (one is located on each of the upright portions 214) for the purposes of this discussion. Joints 216A and 216B are aligned along an axis 218 so that the lift arm assembly is capable of pivoting, as discussed below, with respect to the frame 210 about axis 218. Other power machines may not include upright portions on either side of the frame or may not have a lift arm assembly that is mountable to upright portions on either side and toward the rear of the frame. For example, some power machines may have a single arm, mounted to a single side of the power machine or to a front or rear end of the power machine. Other machines can have a plurality of work elements, including a plurality of lift arms, each of which is mounted to the machine in its own configuration. Frame 210 also supports a pair of tractive elements in the form of wheels 219A-D on either side of the loader 200.

The lift arm assembly 230 shown in FIGS. 2-3 is one example of many different types of lift arm assemblies that can be attached to a power machine such as loader 200 or other power machines on which examples of the present discussion can be practiced. The lift arm assembly 230 is what is known as a vertical lift arm, meaning that the lift arm assembly 230 is moveable (i.e., the lift arm assembly can be raised and lowered) under control of the loader 200 with respect to the frame 210 along a lift path 237 that forms a generally vertical path. Other lift arm assemblies can have different geometries and can be coupled to the frame of a loader in various ways to provide lift paths that differ from the radial path of lift arm assembly 230. For example, some lift paths on other loaders provide a radial lift path. Other lift arm assemblies can have an extendable or telescoping portion. Other power machines can have a plurality of lift arm assemblies attached to their frames, with each lift arm assembly being independent of the other(s). Unless specifically stated otherwise, none of the inventive concepts set forth in this discussion are limited by the type or number of lift arm assemblies that are coupled to a particular power machine.

The lift arm assembly 230 has a pair of lift arms 234 that are disposed on opposing sides of the frame 210. A first end 232A of each of the lift arms 234 is pivotally coupled to the power machine at joints 216 and a second end 232B of each of the lift arms is positioned forward of the frame 210 when in a lowered position as shown in FIG. 2. Joints 216 are located toward a rear of the loader 200 so that the lift arms extend along the sides of the frame 210. The lift path 237 is defined by the path of travel of the second end 232B of the lift arms 234 as the lift arm assembly 230 is moved between a minimum and maximum height.

Each of the lift arms 234 has a first portion 234A of each lift arm 234 is pivotally coupled to the frame 210 at one of the joints 216 and the second portion 234B extends from its connection to the first portion 234A to the second end 232B of the lift arm assembly 230. The lift arms 234 are each coupled to a cross member 236 that is attached to the first portions 234A. Cross member 236 provides increased structural stability to the lift arm assembly 230. A pair of actuators 238, which on loader 200 are hydraulic cylinders configured to receive pressurized fluid from power system 220, are pivotally coupled to both the frame 210 and the lift arms 234 at pivotable joints 238A and 238B, respectively, on either side of the loader 200. The actuators 238 are sometimes referred to individually and collectively as lift cylinders. Actuation (i.e., extension and retraction) of the actuators 238 cause the lift arm assembly 230 to pivot about joints 216 and thereby be raised and lowered along a fixed path illustrated by arrow 237. Each of a pair of control links 217 are pivotally mounted to the frame 210 and one of the lift arms 232 on either side of the frame 210. The control links 217 help to define the fixed lift path of the lift arm assembly 230.

Some lift arms, most notably lift arms on excavators but also possible on loaders, may have portions that are controllable to pivot with respect to another segment instead of moving in concert (i.e., along a pre-determined path) as is the case in the lift arm assembly 230 shown in FIG. 2. Some power machines have lift arm assemblies with a single lift arm, such as is known in excavators or even some loaders and other power machines. Other power machines can have a plurality of lift arm assemblies, each being independent of the other(s).

An implement interface 270 is provided proximal to a second end 232B of the lift arm assembly 234. The implement interface 270 includes an implement carrier 272 that is capable of accepting and securing a variety of different implements to the lift arm 230. Such implements have a complementary machine interface that is configured to be engaged with the implement carrier 272. The implement carrier 272 is pivotally mounted at the second end 232B of the arm 234. Implement carrier actuators 235 are operably coupled the lift arm assembly 230 and the implement carrier 272 and are operable to rotate the implement carrier with respect to the lift arm assembly. Implement carrier actuators 235 are illustratively hydraulic cylinders and often known as tilt cylinders.

By having an implement carrier capable of being attached to a plurality of different implements, changing from one implement to another can be accomplished with relative ease. For example, machines with implement carriers can provide an actuator between the implement carrier and the lift arm assembly, so that removing or attaching an implement does not involve removing or attaching an actuator from the implement or removing or attaching the implement from the lift arm assembly. The implement carrier 272 provides a mounting structure for easily attaching an implement to the lift arm (or other portion of a power machine) that a lift arm assembly without an implement carrier does not have.

Some power machines can have implements or implement like devices attached to it such as by being pinned to a lift arm with a tilt actuator also coupled directly to the implement or implement type structure. A common example of such an implement that is rotatably pinned to a lift arm is a bucket, with one or more tilt cylinders being attached to a bracket that is fixed directly onto the bucket such as by welding or with fasteners. Such a power machine does not have an implement carrier, but rather has a direct connection between a lift arm and an implement.

The implement interface 270 also includes an implement power source 274 available for connection to an implement on the lift arm assembly 230. The implement power source 274 includes pressurized hydraulic fluid port to which an implement can be removably coupled. The pressurized hydraulic fluid port selectively provides pressurized hydraulic fluid for powering one or more functions or actuators on an implement. The implement power source can also include an electrical power source for powering electrical actuators or an electronic controller on an implement. The implement power source 274 also exemplarily includes electrical conduits that are in communication with a data bus on the excavator 200 to allow communication between a controller on an implement and electronic devices on the loader 200.

Figure 4:
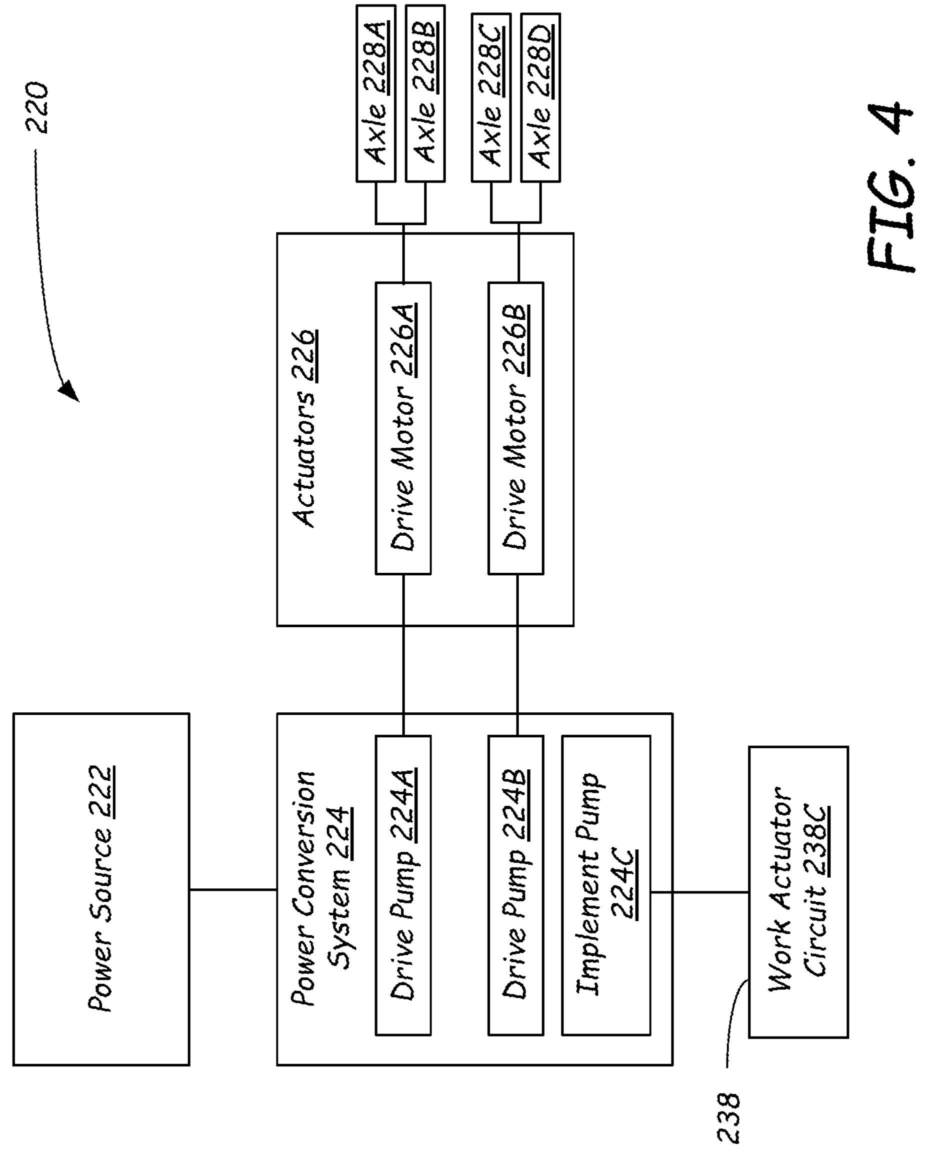
FIG. 4 is a block diagram illustrating components of a power system of a loader such as the loader illustrated in FIGS. 2-3.

Frame 210 supports and generally encloses the power system 220 so that the various components of the power system 220 are not visible in FIGS. 2-3. FIG. 4 includes, among other things, a diagram of various components of the power system 220. Power system 220 includes one or more power sources 222 that are capable of generating or storing power for use on various machine functions. On power machine 200, the power system 220 includes an internal combustion engine. Other power machines can include electric generators, rechargeable batteries, various other power sources or any combination of power sources that can provide power for given power machine components. The power system 220 also includes a power conversion system 224, which is operably coupled to the power source 222. Power conversion system 224 is, in turn, coupled to one or more actuators 226, which can perform a function on the power machine. Power conversion systems in various power machines can include various components, including mechanical transmissions, hydraulic systems, and the like. The power conversion system 224 of power machine 200 includes a pair of hydrostatic drive pumps 224A and 224B, which are selectively controllable to provide a power signal to drive motors 226A and 226B. The drive motors 226A and 226B in turn are each operably coupled to axles, with drive motor 226A being coupled to axles 228A and 228B and drive motor 226B being coupled to axles 228C and 228D. The axles 228A-D are in turn coupled to tractive elements 219A-D, respectively. The drive pumps 224A and 224B can be mechanically, hydraulic, or electrically coupled to operator input devices to receive actuation signals for controlling the drive pumps.

The arrangement of drive pumps, motors, and axles in power machine 200 is but one example of an arrangement of these components. As discussed above, power machine 200 is a skid-steer loader and thus tractive elements on each side of the power machine are controlled together via the output of a single hydraulic pump, either through a single drive motor as in power machine 200 or with individual drive motors. Various other configurations and combinations of hydraulic drive pumps and motors can be employed as may be advantageous.

The power conversion system 224 of power machine 200 also includes a hydraulic implement pump 224C, which is also operably coupled to the power source 222. The hydraulic implement pump 224C is operably coupled to work actuator circuit 238C. Work actuator circuit 238C includes lift cylinders 238 and tilt cylinders 235 as well as control logic to control actuation thereof. The control logic selectively allows, in response to operator inputs, for actuation of the lift cylinders or tilt cylinders. In some machines, the work actuator circuit 238C also includes control logic to selectively provide a pressurized hydraulic fluid to an attached implement. The control logic of power machine 200 includes an open center, 3 spool valve in a series arrangement. The spools are arranged to give priority to the lift cylinders, then the tilt cylinders, and then pressurized fluid to an attached implement.

The description of power machine 100 and loader 200 above is provided for illustrative purposes, to provide illustrative environments on which the examples discussed below can be practiced. While the examples discussed can be practiced on a power machine such as is generally described by the power machine 100 shown in the block diagram of FIG. 1 and more particularly on a loader such as track loader 200, unless otherwise noted or recited, the concepts discussed below are not intended to be limited in their application to the environments specifically described above.

Figure 5:
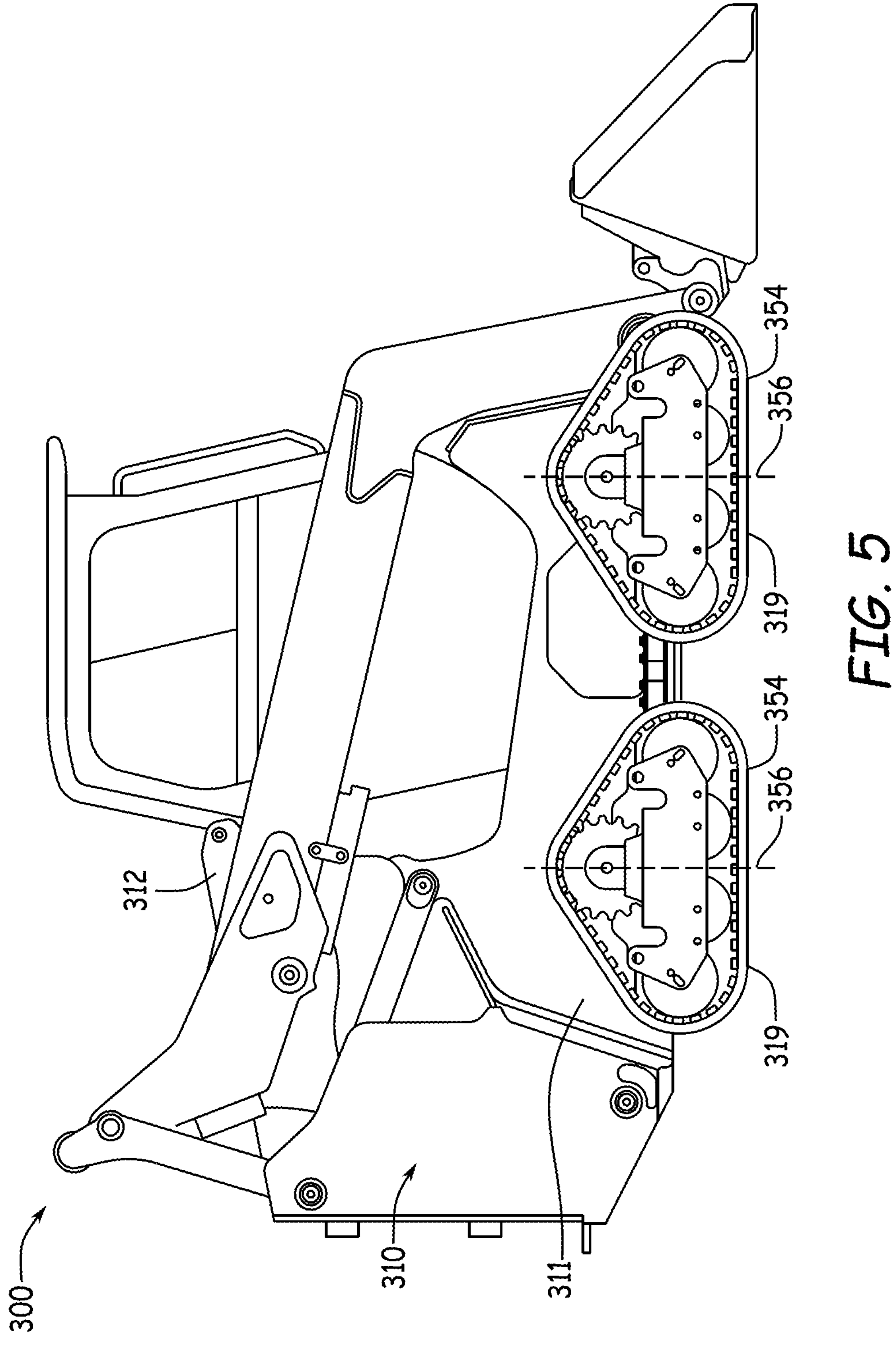
FIG. 5 illustrates a side plane view of a representative quad-track loader on which the disclosed technology can be practiced, showing two of four endless track pods mounted on the machine.

FIG. 5 illustrates a loader 300, which is one particular example of a power machine of the type illustrated in FIG. 1 on which the examples discussed herein can be advantageously employed. Similar to the loader 200, the particular illustrated configuration of the loader 300 should not be considered limiting, especially as to the description of features that loader 200 that are not essential to the disclosed technology and thus may or may not be included in power machines other than loader 300 upon which the examples disclosed below may be advantageously practiced. Unless specifically noted otherwise, examples disclosed below can be practiced on a variety of power machines, with the loader 300 being only one of those power machines. For example, some or all of the concepts discussed below can be practiced on many other types of work vehicles such as various other loaders including compact track loaders and mini-loaders, excavators, trenchers, and dozers, to name but a few examples.

The loader 300 is configured as a quad-track compact track loader that is generally similar to the loader 200, with like reference numerals generally referring to like features, unless otherwise indicated. In particular, the power machine 300 includes a main frame 310 having a lower frame 311 and an upper frame 312 that is supported by the lower frame 311. With additional reference to FIG. 6 in particular (showing a simplified view of a track frame for a track pod), each side of the lower frame 311 operatively supports two rigid axles 328 (only one shown) that extend outwardly from lower frame 311. Each axle 328 defines a drive axis 330 and includes a rotatable shaft 328A that is partially surrounded by a non-rotating axle tube 328B. The axle tube 328B is rigidly supported by the frame 310 and the axle shaft 328A can rotate within the axle tube 328B. Additionally, a hub 332 is supported on a distal end of the axle shaft 328A, which extends out of the axle tube 328B, to rotate with the axle shaft 328A. Furthermore, in some examples, a stub shaft 334 can be coupled to and extend outwardly from the hub 332. In other examples, a stub shaft or other mounting feature can be integrally formed with a hub or an axle shaft.

Each axle 328 is configured to operatively support a tractive element 319. In the illustrated example, each tractive element 319 is configured as an endless track pod 319 that can be supported and driven by one of the respective axles 328 to propel the loader 300. More specifically, as will be discussed in greater detail below, each endless track pod 319 includes a track frame 350 that is rotatably coupled to a respective axle 328. The track frame 350 supports and is surrounded by an endless track 354 (see FIG. 1) that rotates under power from the axle 328 to propel the loader 300 over a support surface. As illustrated, each of the endless track pods 319 are similar to one another and symmetrical in various ways, which can allow any one of the endless track pods 319 to be selectively installed on any of the axles 328 (e.g., a front-left, front-right, rear-left, or rear-right axle). For example, the track frame 350 and the endless track 354 can be generally symmetrical about a vertical plane 356 and corresponding vertical reference line (see FIG. 5) that passes through the drive axis 330 of the respective axle 328 when the endless track pod 319 is supported by the loader 300. More generally, other beneficial arrangements for a track pod can exhibit symmetry about a similar plane or reference line that corresponds to a drive axis of a track pod or a pivot axis for the track pod relative to an associated power machine (i.e., a plane or reference line that, in a front-toback direction, is spaced apart from a vertical plane that intersects such an axis by a distance of no more than 8% of the total front-to-back length of the track pod).

Although some of the discussion below refers only to a single endless track pod 319, the principles discussed generally apply equally to each of the remaining endless track pods 319. Correspondingly, some track pods according to the disclosed technology, including various symmetrically arranged pods (as further discussed below) can be generally interchangeable among different axles and different sides of a power machine, in contrast to conventional non-interchangeable pods. For example, track pods 319 are illustrated as being substantially identical to each other and fully interchangeable among all axles of the illustrated quad-track power machine. This general interchangeability may provide notable benefits for manufacturing and maintenance operations. However, in some cases, each endless track pod may be configured differently. For example, each track pod of a set can be particularly adapted for use with a specific axle or side of a power machine (e.g., a front axle or a rear axle or on the left or right side of the power machine).

Figure 6:
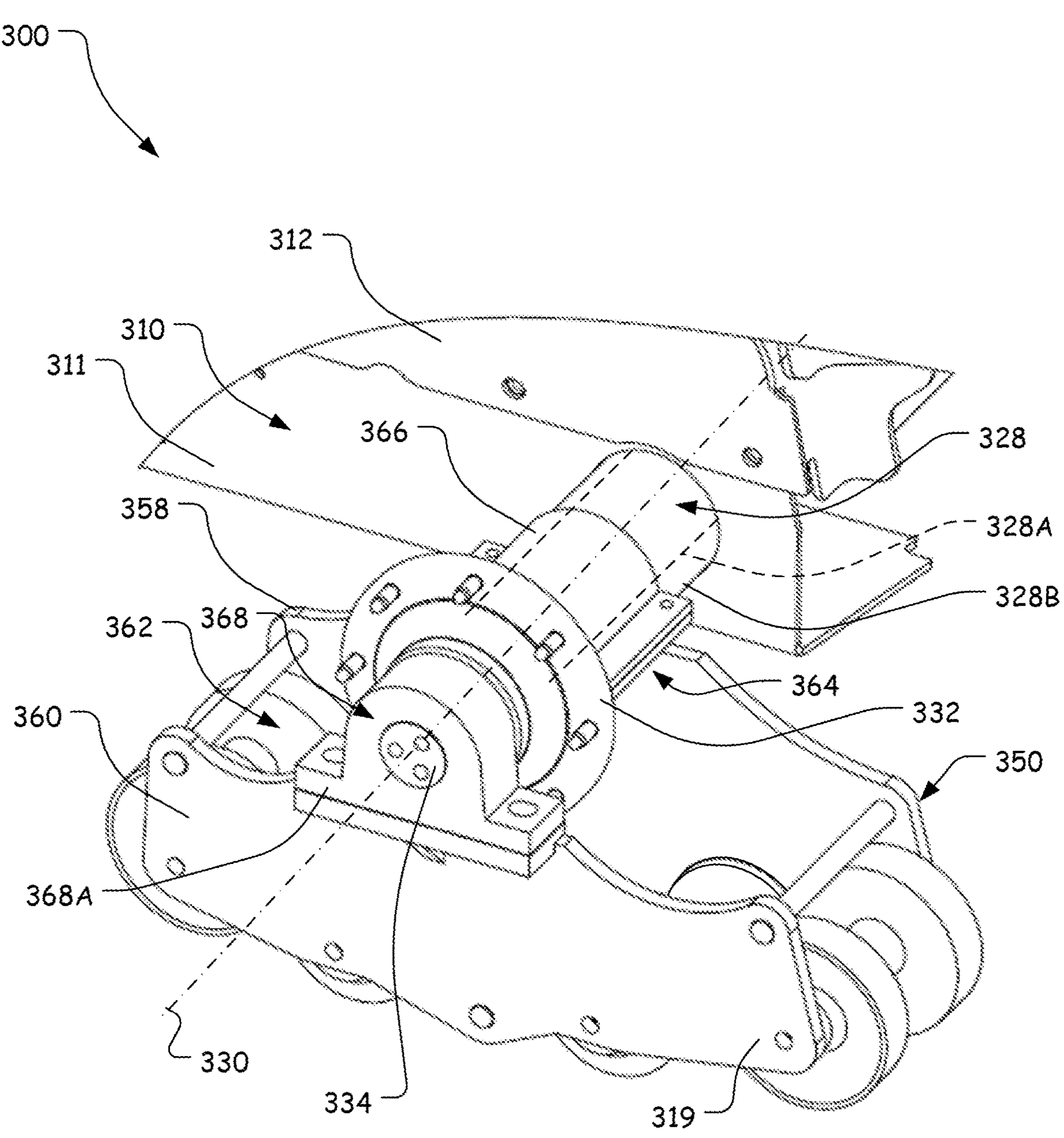
FIG. 6 illustrates a simplified version of a track frame of an endless track pod of the type shown on FIG. 5.

With continued reference to FIG. 6, each endless track pod 319 can include a track frame 350 that is configured to rotatably coupled to a respective axle 328. More specifically, the track frame 350 includes an inboard support plate 358 and an outboard support plate 360 that are spaced apart from one another to define an interior space 362 therebetween. Each of the inboard plate 358 and the outboard plate 360 can be configured to rotatably support the endless track pod 319 on the axle 328. For example, in the illustrated example, the inboard plate 358 defines an upper recess 364 that is configured to receive a portion of the axle tube 328B. More specifically, the upper recess 364 acts a bearing surface that is configured to engage with the axle tube 328B to support the endless track pod 319 on the axle 328, and to allow the track frame 350 to rotate about the axle 328 (i.e., the drive axis 330). In some examples, a cap 366 can be placed over the axle tube 328B and coupled to the inboard plate 358 (e.g., by fasteners) to secure the axle tube 328B in the upper recess 364. Accordingly, the upper recess 364 and the cap 366 form a bushing that rotatably secures the track frame 350 to the axle 328, although other configurations are possible. Correspondingly, the track frame 350 is free to pivot relative to the axle 328 to allow for effective travel over a variety of support surfaces.

In some examples, further structures can be provided to help rotatably support a track assembly relative to an axle. For example, the outboard plate 360 can include a bearing or a bushing that is configured to engage with the stub shaft 334. In the illustrated example, the outboard plate 360 includes a bearing 368 configured as a pillow block bearing to rotatably support the track frame 350 relative to the axle 328. The bearing 368 includes a housing 368A, which can be removably or fixedly secured to the outboard plate 360 (e.g., by fasteners or welding). The bearing 368 can further include an inner bearing (e.g. a sealed ball bearing, not shown) disposed within the housing 368A. The inner bearing can be configured to receive the stub shaft 334 to allow the stub shaft 334 (and the hub 332 and the axle shaft 328A) to rotate freely relative to the track frame 350. Correspondingly, the track frame 350 can also be free to pivot relative to the axle 328, even while the endless track pod 319 is being powered by the axle 328, to allow for effective travel over a variety of support surfaces.

Figure 9:
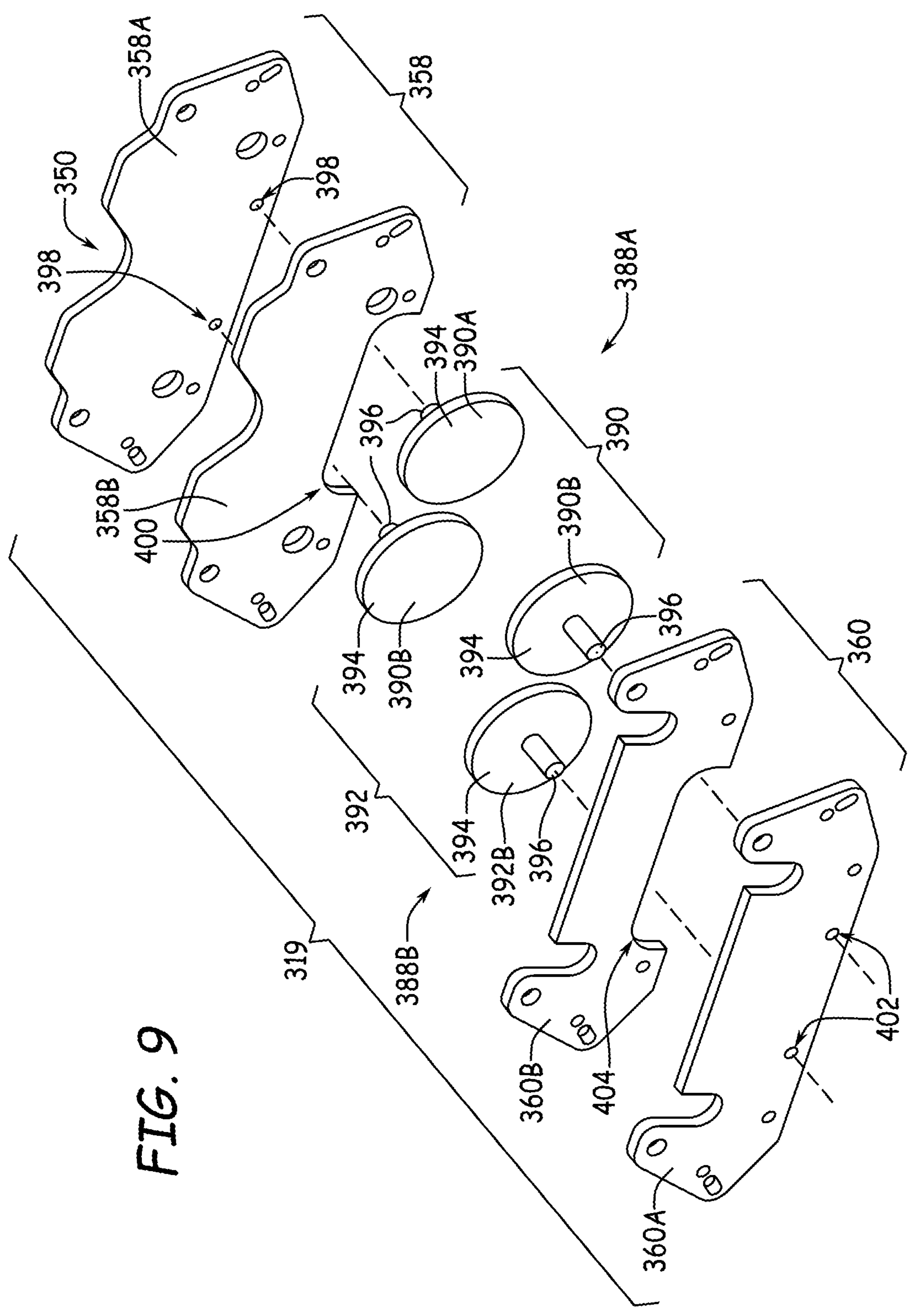
FIG. 9 is an exploded partial perspective view of the endless track pod of FIG. 7, showing an example layered plate configuration for a track frame and a set of rollers
Figure 10:
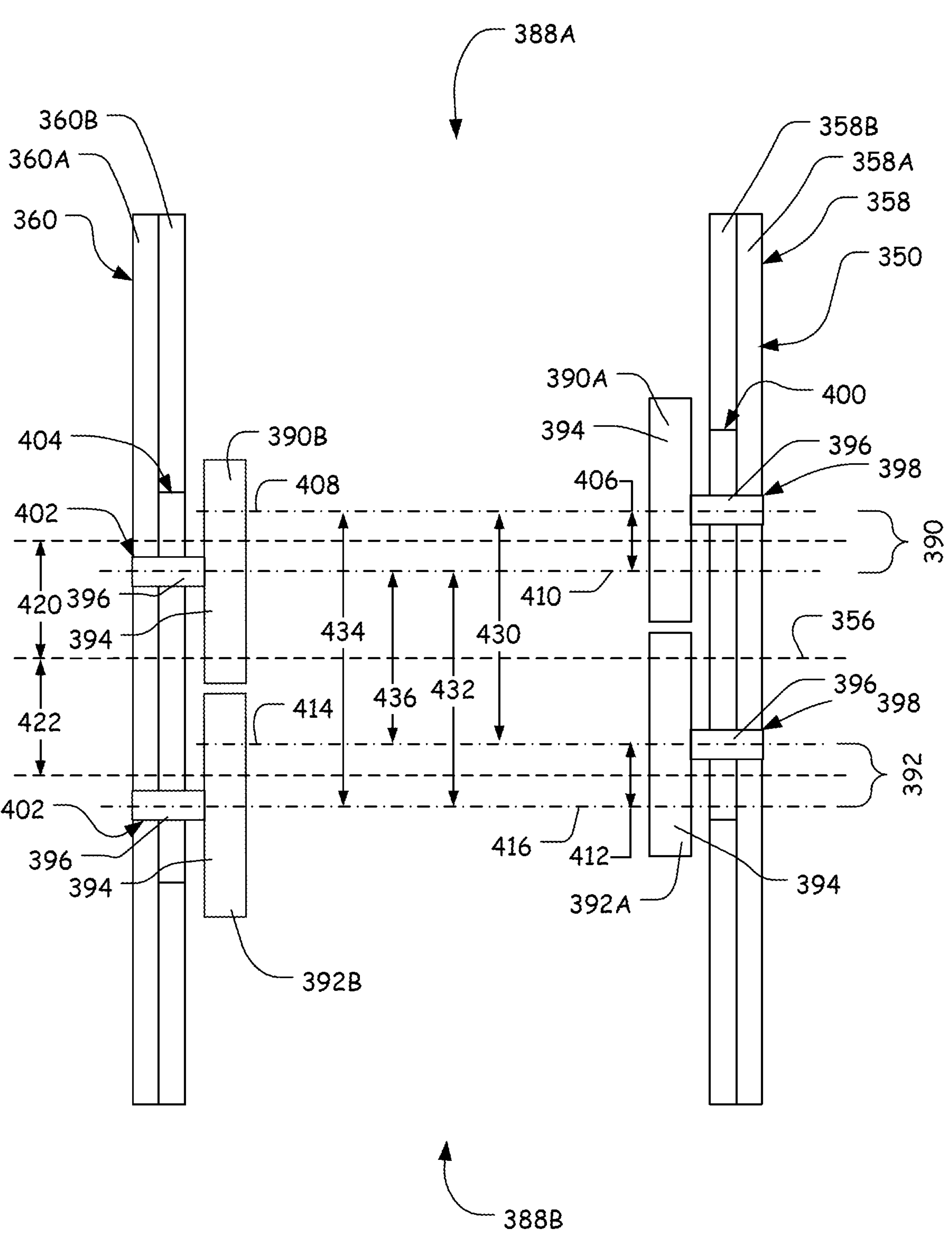
FIG. 10 is a bottom section view of the endless track pod of FIG. 8 taken along line X-X of FIG. 8.

The track pod 319 is illustrated in FIG. 6 with a simplified configuration, to facilitate clearer presentation of certain aspects thereof. In some examples, other configurations are possible, including as illustrated in FIGS. 7 through 10. For example, as shown in FIGS. 9 and 10, the inboard and outboard plates 358, 360 of the track frame 350 can included multiple discrete plates, stacked together to form an integrated plate structure.

Figure 7:
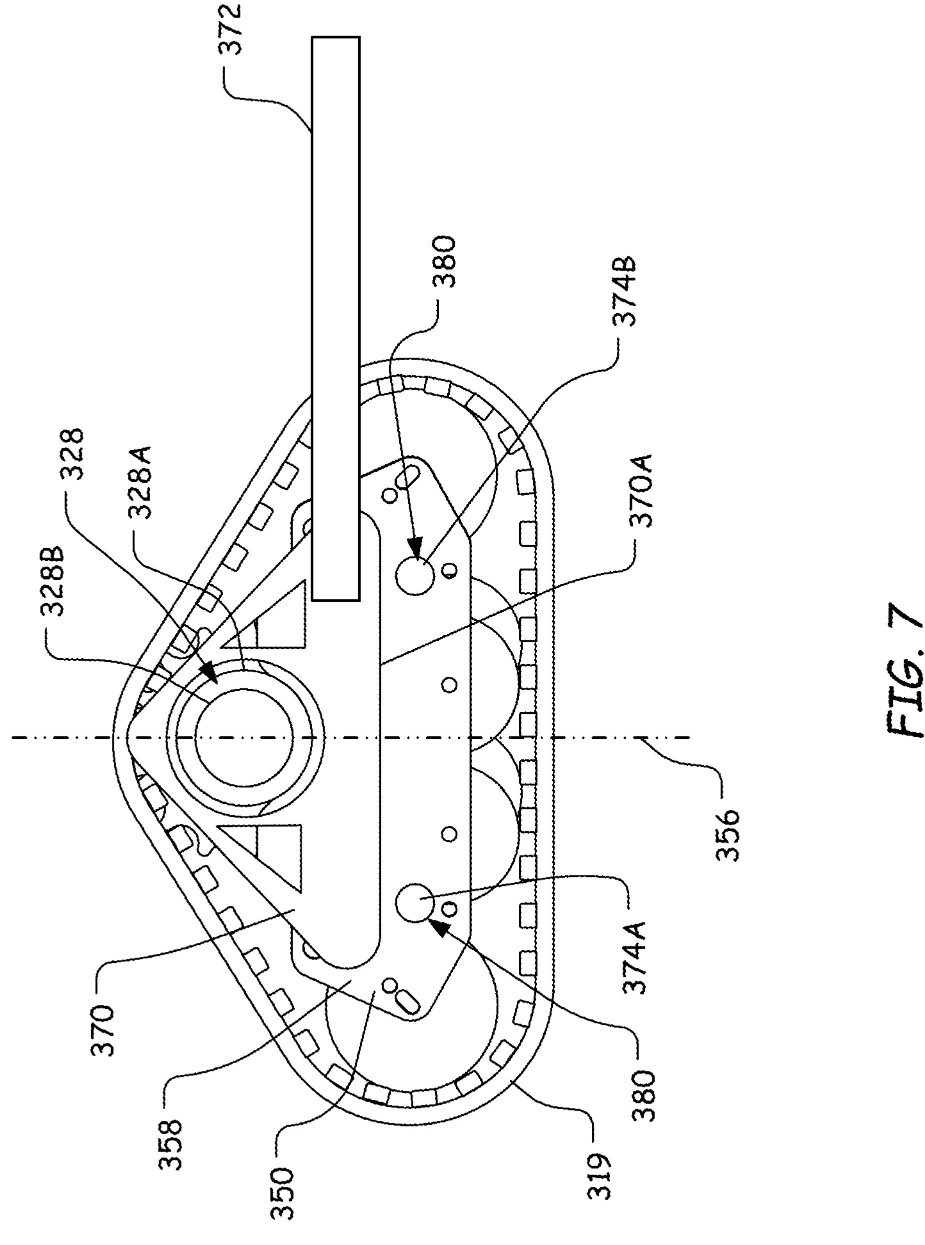
FIG. 7 is an inboard side plan view of one of the endless track pods of the loader of FIG. 5, showing a section view of an axle assembly of the loader and an anti-rotation bracket supported on the axle assembly.

While allowing a track pod to rotate freely about an axle can provide for improved tractive capabilities, it may also be beneficial to limit the rotation of a track pod relative to the axle. Accordingly, as illustrated in FIG. 7, the endless track pod 319 can be installed with an anti-rotation bracket 370 that is configured to act as a physical stop that limits the rotation of the endless track pod 319 about the drive axis 330 of the axle 328. In some examples, the anti-rotation bracket 370 is freely supported on the axle tube 328B, inboard of the inboard plate 358 of the track frame 350, so that the track frame 350 can rotate relative to the anti-rotation bracket 370. To prevent the anti-rotation bracket 370 itself from rotating about the axle tube 328B, the anti-rotation bracket 370 can also be coupled, for example, by a connecting beam 372, to a corresponding anti-rotation bracket of the other endless track pod (not shown in FIG. 7) that is disposed on the same lateral side of the loader 300. In other examples, other configurations are possible.

To stop the endless track pod 319 from rotating, the anti-rotation bracket 370 defines a frame engagement surface 370A that is configured to engage with the track frame 350 to limit the rotation of the endless track pod 319. More specifically, the inboard plate 358 of the track frame 350 includes a first pin 374A and a second pin 374B that extend from a bottom half of the inboard plate 358 toward the frame 310 of the loader 300. Each of the first pin 374A and the second pin 374B are shown as received in holes 380 formed in the inboard plate 358, which are symmetrically spaced about the vertical plane 356 (and corresponding reference line). In some cases, other pins (e.g., non-circular pins) can be welded to the track frame or otherwise installed. Via contact between the pins 374A, 374B and the frame engagement surface 370A, the anti-rotation bracket 370 can limit the rotation of the endless track pod 319 about the drive axis 330 in both directions, including as may further facilitate the ability to install the track pod 319 at any axle of a power machine.

In the present example, the relative size and spacing of the anti-rotation bracket 370 and the first and second pins 374A, 374B can limit the rotation of the endless track pod 319 to between 10 and 30 degrees in either direction and, more preferably, approximately 15 degrees in either direction. In other examples, a track pod can be configured to permit differing amounts of rotation in either direction.

Figure 8:
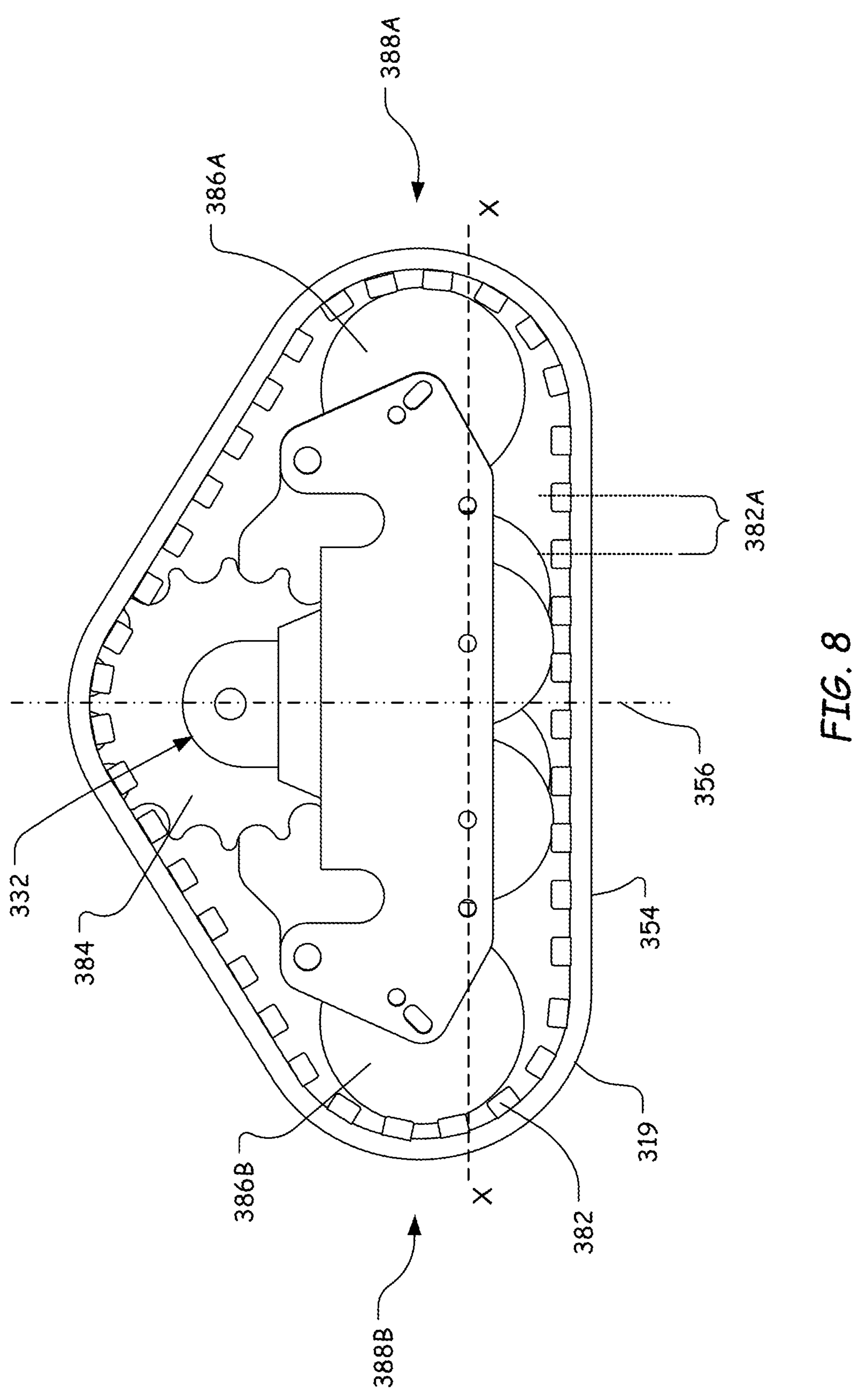
FIG. 8 is an outboard side plan view of the track pod of FIG. 7.

Turning now to FIG. 8, as mentioned above, an endless track pod can include an endless track that surrounds and is supported by a track frame. The endless track can be configured to engage with powered device (e.g., a sprocket secured to axle of a loader) so that the powered device can cause the endless track to rotate about the track frame to propel the loader. Generally, rubber endless tracks include regularly spaced embeds that are integrated into the endless track (i.e., the rubber is molded over the embeds) to provide stiffness and strength to the tracks. The drive sprocket 384 will engage sides of the embeds 382 (the drive sprocket has teeth that are aligned with holes in the track positioned between the embeds 382 to help hold the track in place) to apply drive force to the track. The inclusion of the embeds 382 into the endless track 354 results in regularly spaced protrusions that extend inward along an inside surface of the track with valleys between the embeds to create an uneven surface over which rollers will move. (In actuality, the track will move under the rollers.) The embeds 382 are configured as a plurality of equally-spaced protrusions or lugs that extend from an interior surface of the endless track 354 toward the track frame 350. Accordingly, the embeds 382 define a pitch 382A (e.g., a center-to-center dimension between adjacent protrusions) that corresponds with a pitch of the teeth of the sprocket 384 to allow for continuous power transfer from the axle 328 to the endless track 354.

Other components can also be included to allow operation of a track pod. For example, in the illustrated example, the endless track pod 319 includes a first idler 386A proximate a first end 388A of the track frame 350 and a second idler 386B proximate a second end 388B of the track frame 350, opposite the first end 388A. Each of the first idler 386A and the second idler 386B is supported by an axle that extends between the inboard plate 358 and the outboard plate 360, so that each of the idlers 386A, 386B are supported on both sides. In some cases, one or both of the first idler 386A and the second idler 386B can be coupled to a tensioner (not shown), which can be configured to adjust the position of an idler relative to the track frame 350 to ensure appropriate tension on the endless track 354. Accordingly, the first and second idlers 386A, 386B can engage the endless track 354 along the embeds 382 and rotate relative to the track frame 350 with the endless track 354.

Additionally, to further support an endless track between idlers and to better distribute the weight of a loader on a support surface, an endless track pod can include a plurality of rollers disposed between the idlers, along a front-to-back direction (e.g., right to left, as shown in FIG. 8). In traditional track frame assemblies, rollers can be provided that are mounted to inboard and outboard plates, with a plurality of rollers mounted to an axle that is rotatably connected to each of the plates and are aligned with each other. These rollers can be configured to engage with the endless track and, through the endless track, engage a support surface to support and distribute the weight of a loader. In some examples, as shown in FIGS. 9 and 10, the endless track pod 319 includes a plurality of rollers configured as two sets of rollers, namely, a first set of split rollers 390 and a second set of split rollers 392, rotational axes of which are disposed on opposing sides of the vertical plane 356. Unlike traditional rollers, the split rollers are not mounted to a single thru-axle and are, therefore, not required to be aligned with each other along a common axis of rotation. The term split rollers in this discussion refers to a pair of rollers, a first of which is mounted to one side of a track frame and a second of which is mounted to another side of a track frame and that are at least generally aligned with each other but are not directly connected to each other. By generally aligned, it is meant that axis of rotation of each of the rollers is, in a front-to-back direction, offset by no more than the diameter of the roller relative to the other roller. In some cases, the front-to-back alignment of the axes of rotation of the split rollers is offset by no more than 0.5 times the overall diameter of the rollers. Thus, the split rollers are in alignment or generally in alignment (as qualified above) with each other. As is discussed below, advantageous offsets between a set or sets of split rollers in a track assembly is determined by various factors.

Split rollers can be configured in a variety of ways, including with regard to which rollers in particular are positioned at more inboard or more outboard positions relative to the associated power machine. In particular, in the illustrated example, the first set of split rollers 390 includes an inboard or first roller 390A that is rotatably supported by the inboard plate 358 and an outboard or second roller 390B that is rotatably supported by the outboard plate 360. Similarly, the second set of split rollers 392 includes an inboard or third roller 392A that is rotatably supported by the inboard plate 358 and an outboard or fourth roller 392B that is rotatably supported by the outboard plate 360. In other examples, additional or fewer sets of rollers may be provided, which may sometimes also be configured as sets of split rollers.

Each individual roller can be independently supported by a respective outboard or inboard plate so that the individual rollers can independently rotate with an endless track. For example, each roller 390A-392B includes a roller body 394 that is separately cantilevered from the respective inboard and outboard plates 358, 360 of the track frame 350 by a corresponding roller axle 396. Accordingly, the respective inboard and outboard plates 358, 360 can be configured to rotatably support each of the rollers 390A-392B. The split rollers, then, are independent of each other and are not part of a unitary assembly.

In some examples, a multi-layered plate structure can provide a beneficial mounting support for split rollers. For example, in the illustrated example, the inboard plate 358 includes a first exterior plate 358A that is coupled to a first interior plate 358B. The first exterior plate 358A defines a first plurality of holes 398 to rotatably receive and support the corresponding roller axle 396 of each of the first roller 390A and the third roller 392A. In some cases, each of the first plurality of holes 398 may be configured to receive a bearing (e.g., a roller bearing, not shown) to allow the first and third rollers 390A, 392A to independently rotate with respect to the inboard plate 358, or a bearing can be included within the rollers 390A, 392A themselves.

Continuing, in some cases, a multi-layer plate structure can allow for a roller to be nested within a notch or other cutout (e.g., a cast recess) on a side plate of a track frame. For example, the first interior plate 358B can include a first cutout 400 that can be configured to receive the first roller 390A or the third roller 392A (e.g., at least a portion of a respective roller body 394 or roller axle 396 of each of the rollers 390A, 392A). Correspondingly, the first interior plate 358B can be disposed laterally between the first and third rollers 390A, 392A and the first exterior plate 358A. In some cases, a cutout (e.g., similar to the cutout 400) can be sized so that an entire roller (e.g., the split rollers 390A, 392A) can be received and rotate within the cutout. For example, some cutouts can exhibit a front-to-back length that is at least two times a relevant roller diameter, so that the cutouts can receive the full diameter of two adjacent split rollers. In other cases, only a portion of the roller will be seated within the cutouts and the cutouts can be sized appropriately. For example, an axle or other reduced-diameter feature of the roller that extends transverse to the full (track-engaging) diameter of the roller can extend through a cut-out in an exterior direction relative to the track pod as a whole.

Similar to the inboard plate 358, the outboard plate 360 includes a second exterior plate 360A having a second plurality of holes 402 configured to rotatably receive and support the corresponding roller axle 396 of each of the second roller 390B and the fourth roller 392B. The second exterior plate 360A is coupled to a corresponding second interior plate 360B with a second cutout 404 that can be configured to receive the second roller 390B or the fourth roller 392B (e.g., at least in part, a respective roller body 394 or roller axle 396 of each of the rollers 390B, 392B). Correspondingly, the second interior plate 360B can be disposed laterally between the second and fourth rollers 390B, 392B and the second exterior plate 360A. In some cases, a cutout (e.g., similar to the cutout 404) can be sized so that a roller (e.g., the split rollers 390B, 392B) can be received and rotate within the cutout. For example, some cutouts can exhibit a front-to-back length that is at least two times a relevant roller diameter, so that the cutouts can receive the full diameter of two adjacent split rollers. In other cases, only a portion of the overall diameter of the roller—e.g., an inner feature of the roller that extends in a direction that is transverse to the diameter of the roller—will be seated within the cutouts and the cutouts can be sized appropriately to receive the inner feature.

In some cases, because of the additional space provided by the cutouts 400, 404, the rollers of each set of split rollers 390, 392 can be spaced widely apart from each other along a direction extending between the inboard plate 358 and the outboard plate 360 (e.g., parallel with the drive axis 330). In other examples, an outboard plate or an inboard plate may only include a single plate or may be otherwise configured in known ways to support one or more rollers.

As generally noted above, it may be useful to space rollers of a track frame with particular offset distances between rotational axes, to provide an improved ride for a power machine. In this regard, with reference now to FIGS. 10 and 11, because each roller 390A-392B is independently supported, the rollers in each set of split rollers 390, 392 can be spaced apart along a front-to-back direction extending between the first end 388A of the endless track pod 319 and the second end 388B of the endless track pod 319 (e.g., along a front-to-back direction that is perpendicular to the drive axis 330). Put another way, with regard to the first set of split rollers 390, the first roller 390A and the second roller 390B do not have to be in axial alignment with one another along a front-to-back direction and can define a first axial or roller offset distance 406 between a first axis of rotation 408 of the first roller 390A and a second axis of rotation 410 of the second roller 390B. Likewise, with regard to the second set of split rollers 392, the third roller 392A and the fourth roller 392B also do not have to be in axial alignment with one another along a front-to-back direction and can define a second axial or roller offset distance 412 between a third axis of rotation 414 of the third roller 392A and a fourth axis of rotation 416 of the fourth roller 392B.

Accordingly, laterally adjacent sets of rollers (e.g., the rollers 390A, 390B, or the rollers 392A, 392B) can have roller bodies (e.g., roller bodies 394) that overlap along a front-to-back direction—i.e., extend at least partly over a common range of locations in the front-to-back direction. For example, as illustrated, the roller body 394 of the first roller 390A overlaps with the roller body 394 of the second roller 390B relative to the front-to-back direction, although the rollers 390A, 390B are support on opposite lateral sides of the track frame. Similarly, the roller body 394 of the second roller 390B overlaps with the roller bodies 394 of the first roller 390A and the third roller 392A, the roller body 394 of the third roller 392A overlaps with the roller bodies 394 of the second roller 390B and the roller body 394 of the fourth roller 392B, and the roller body 394 of the fourth roller 392B overlaps with the roller body 394 of the third roller 392A. In other examples, depending on the roller offset distance of each set of split rollers and the distance between different sets of split rollers, the rollers may overlap differently, or not at all.

In some examples, as an endless track passes along the rollers, the rollers can be repeatedly forced downward by the weight of a loader and into a gap between adjacent embeds, which can create vibrations that can be felt by an operator. In some examples disclosed herein, the relative spacing of the rollers can optimally place the rollers out of time with the embeds, thereby reducing the amount of vibration (e.g., by canceling vibrations) felt by an operator and improving ride quality. For example, with continued reference to FIG. 10, the illustrated spacing between rotational axes can ensure that any combination of the rollers 490A, 490B of the first set of split rollers 390 and the rollers 492A, 492B of the second set of split rollers 392, respectively, are out of time with the embeds 382.

In some examples, in particular, a first ratio of the first roller offset distance 406 to the pitch 382A of the embeds 382 and a second ratio of the second roller offset distance 412 to the pitch 382A of the embeds 382 is not equal to 0.5 or any multiples thereof (e.g., 0, 0.5, 1.0, 1.5, 2.0, etc.). Rather, the respective first and second ratios can range between any of greater than 0 and less than 0.5, greater than 0.5 and less than 1.0, greater than 1.0 and less than 1.5, or greater than 1.5 and less than 2.0, and so on. In the illustrated example, the first ratio the first roller offset distance 406 to the pitch 382A of the embeds 382 and the second ratio of the second roller offset distance 412 to the pitch 382A of the embeds 382 are equal and can specifically be within a range from greater than 0.5 to less than 0.8, or from greater than 0.5 to less than 0.6.

In other examples, rollers can be configured differently. For example, a first ratio of a first roller offset distance to a pitch of the embeds and a second ratio of a second roller offset distance to the pitch of the embeds can range between greater than 0.4 and less than 0.5. Moreover, the first and second ratios may not be equal to one another and at least one may be a multiple of 0.5. For example, a first ratio may be greater than 0 and less than 0.5, while a second ratio may range from greater than 0 to less than 0.3, or a first ratio may range from greater than 1.0 to less than 1.3 while a second ratio may range from greater than 1.4 to less than 1.5.

Relatedly, the relative spacing of different sets of rollers about a vertical plane passing through a drive axis can also be configured to reduce the amount of vibration felt by an operator, thereby improving ride quality. For example, still referring to FIGS. 10 and 11, the first set of split rollers 390 and the second set of split rollers 392 can be arranged so that there is translational and mirror symmetry of the axes of rotation 408, 410, 414, 416 about the vertical plane 356. In this example, the rollers 490A-492B and the axes of rotation 408, 410, 414, 416 have translational symmetry about the vertical plane 356; however, other configurations are possible. Put another way, the first, second, third, and fourth axes of rotation 408, 410, 414, 416 can be collectively symmetrically spaced about the vertical plane 356 (i.e., the drive axis 330), with the first and second axes of rotation 408, 414 and the third and fourth axes of rotation 410, 416 being disposed on opposite sides of the vertical place 356 (e.g., so that the first and second axes of rotation 408, 414 are closer to the first end 388A of the endless track pod 319 than are the third and fourth axes of rotation 410, 416, and so that the third and fourth axes of rotation 410, 416 are closer to the second end 388B of the endless track pod 319 than are the first and second axes of rotation 408, 414).

In that regard, in addition to first roller offset distance 406 and the second roller offset distance 412 being equal, as discussed above, each of the inboard rollers (e.g., at the first axis of rotation 408 and the third axis of rotation 414) are each disposed closer to the first end 388A than are the corresponding outboard rollers (e.g., at the second axis of rotation 410 and the fourth axis of rotation 416). Put differently, the first, second, third, and fourth rollers 390A-392B are arranged along a front-to-back direction so that the first axis of rotation 408 is closest to the first end 388A of the tractive element 319, the fourth axis of rotation 416 is closest to a second end 388B of the tractive element 319, the second axis of rotation 410 is between the first and fourth axes of rotation 408, 416, and the third axis of rotation 414 is between the second and fourth axes of rotation 410, 414 (i.e., the axes 408, 410, 414, 416 are arranged in sequence along the front-to-back direction).

Moreover, a first set spacing 420 (e.g., an average of the respective distances between the vertical plane 356 and each of the first axis of rotation 408 of the first roller 390A and the second axis of rotation 410 of the second roller 390B) is equal to a second set spacing 422 (e.g., an average of the respective distances between the vertical plane 356 and each of the third axis of rotation 414 of the third roller 392A and the fourth axis of rotation 416 of the fourth roller 392B). In other examples, other forms of symmetry can be present, for example, a first set of split rollers and a second set of split rollers can be mirrored about a vertical plane passing through a drive axis of an axle, so that the inboard rollers (e.g. the first and third axes of rotation) are disposed closer to the vertical plane than the outboard rollers (e.g., the second and fourth axes of rotation), and vice versa. In yet other examples, no forms of symmetry may be present with regard to the various axes of rotation.

As also noted above, the first set spacing 420 and the second set spacing 422 can be configured so that each roller in each set of split rollers 390, 392 is out of time with the embeds 382. For example, the first set of split rollers 390 and the second set of split rollers 392 can be arranged so that all combinations of two individual rollers, and in particular the corresponding axes of rotation (e.g., the first rotation axis 408 of the first roller 390A and the second rotation axis 410 of the second roller 390B, the first rotation axis 408 of the first roller 390A and the third rotation axis 414 of the third roller 392A, etc.), are out of time with the embeds 382. In this way, the amount of different contact timings between rollers and embeds can be effectively increased to further reduce vibrations and improve ride quality, because, for example, only one roller will drop into a gap between adjacent embeds 382 at any given point in time during tractive operation of the power machine 300.

Figure 11:
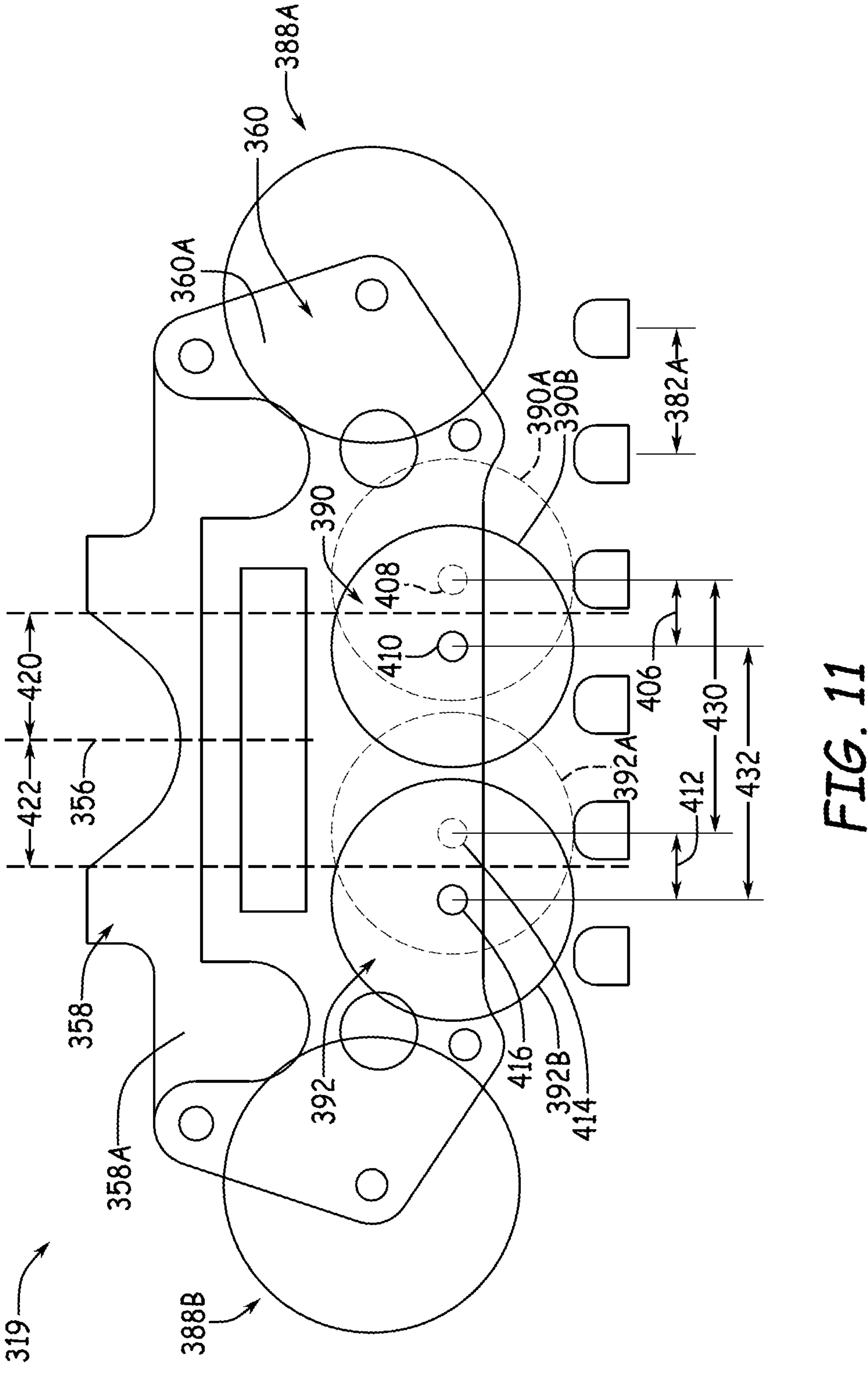
FIG. 11 is a schematic view of the endless track pod FIG. 8 illustrating example spaced relationships of rollers and embeds of an endless track.

More specifically, as illustrated in FIGS. 10 and 11: the first axis of rotation 408 and the third axis of rotation 414 are spaced apart from each other along the front-to-back direction to define a third roller offset distance 430; the second axis of rotation 410 and the fourth axis of rotation 416 are spaced apart from each other along the front-to-back direction to define a fourth roller offset distance 432; the first axis of rotation 408 and the fourth axis of rotation 416 are spaced apart from each other along the front-to-back direction to define an outside or fifth roller offset distance 434 (see FIG. 10), and the second axis of rotation 410 and the third axis of rotation 414 are spaced apart from each other along the front-to-back direction to define an inside or sixth roller offset distance 436.

In some examples, as also noted above, ratios of the first roller offset distance 406 and the second roller offset distance 412 to the pitch 382A of the embeds can be greater than 0.5 and less than 1.0. Further, in some examples, one or more of these other ratios can be additionally (or alternatively) implemented: a ratio of the third roller offset distance 430 to the pitch 382A of the embeds 382 can be greater than 2.0 and less than 2.5; a ratio of the fourth roller offset distance 432 to the pitch 382A of the embeds 382 can be greater than 2.0 and less than 2.5; a ratio of the fifth roller offset distance 434 to the pitch 382A of the embeds 382 can be greater than 2.5 and less than 3.0; and a ratio of the sixth roller offset distance 436 to the pitch 382*a* the embeds 382 can be greater than 1.0 and less than 1.5.

Figure 12:
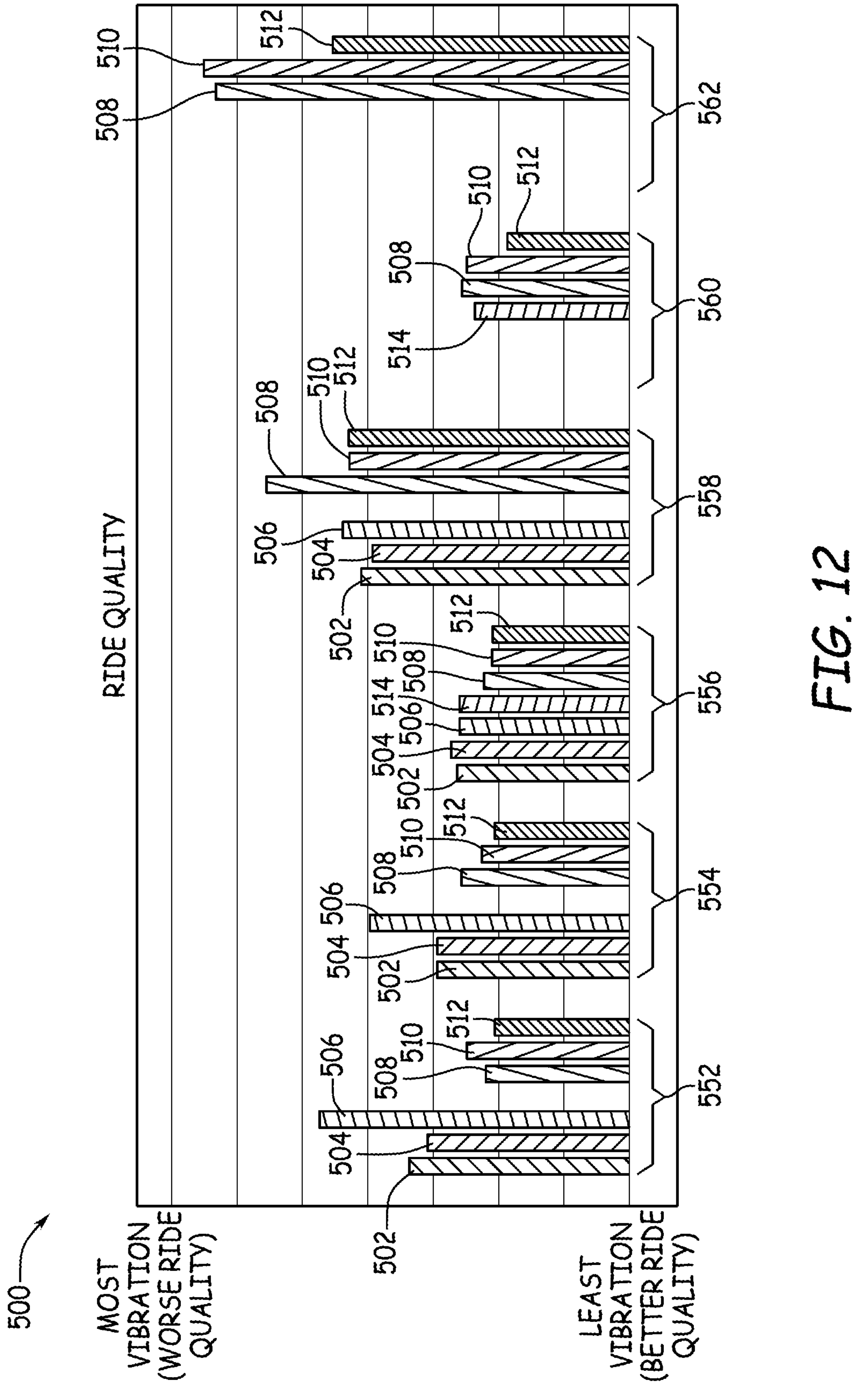
FIG. 12 is a plot comparing the ride quality of endless track pods with different roller configurations under different operational conditions.

In some examples, an implementation of a plurality (e.g., all) of the ratios noted above, in various combination, can provide unexpected benefits for improved ride for a power machine. Turning now to FIG. 12, a plot 500 depicting the relative ride quality of various endless track pods with different roller configurations under different operating conditions is illustrated. In particular, five endless track pods with different roller configurations were tested. A first endless track pod (indicated with bars 502) includes two sets of split rollers with equal roller offsets ranging from greater than 0 to 0.2 with no symmetry across a vertical plane. A second endless track pod (indicated with bars 504) includes two sets of split rollers with equal roller offsets ranging from greater than 0 to 0.1 with no symmetry across a vertical plane. A third endless track pod (indicated with bars 506) includes two sets of split rollers with a first roller offset of 0 and a second roller offset ranging from greater than 0 to 0.1. A fourth endless track pod (indicated with bars 508) includes two sets of split rollers with a first roller offset ranging from 0.4 to less than 0.5 and a second roller offset ranging from greater than 0.3 to 0.4. And a fifth endless track pod (indicated with bars 510) is similar to the endless track pod 319, with two sets of split rollers with equal roller offsets ranging from greater than 0.5 to 0.6 and translational symmetry across a vertical plane. Also shown for comparison are results from simulated application of a load to a sixth track pod (indicated with bars 512) similar to the fifth track pod 510, and a dual-track configuration (indicated with bars 514) with a solid undercarriage and full size left and right track assemblies rather than quad-track pods.

With regard to the operating scenarios, seven different test scenarios were run. The tests were run in single speed (the drive motors are in higher displacement, which translates to a lower top travel speed) or two-speed (the drive motors are in lower displacement, which translates to a higher top travel speed). In particular, the first test 552 was a single speed straight sweep test (move the throttle from low speed to high speed back to low speed-a sweep of the throttle), the second test 554 was a two speed straight sweep test, the third test 556 was a two speed straight test, the fourth test 558 was a two speed circle test (machine was driven in a circle), the fifth test 560 was a single speed straight test, and the seventh test 562 was a single speed circle test. As shown in FIG. 12, the fifth endless track pod 510, due to the particular spacing of the various split rollers (e.g., as detailed in the example discussed above), provides notable improved in ride quality across a wide range of operations as compared to other tested configurations.

Thus, examples of the disclosed technology can provide improved ride quality by way of improved spacing of rollers of an endless track pod. In some examples, symmetrical arrangements of a track pod can also beneficially allow track pods to be flexibly installed at any of a plurality of axles of a power machine, as may streamline and simplify installation and maintenance operations.

Although the presently disclosed technology has been described by referring preferred examples, workers skilled in the art will recognize that changes may be made in form and detail without departing from the scope of the discussion.

What is claimed is:

1. A tractive element for a power machine, the tractive element comprising:

a frame having a first support plate spaced in a lateral direction from a second support plate;

an endless track surrounding and being supported by the frame, the endless track including a plurality of embeds evenly spaced apart that define a pitch of the endless track;

a drive sprocket rotatably coupled to the frame, the drive sprocket being configured to engage and rotate the endless track; and a first set of split rollers including a first roller rotatably coupled to the first support plate with a first axis of rotation and a second roller rotatably coupled to the second support plate with a second axis of rotation, the first axis of rotation and the second axis of rotation being spaced apart from one another along a front-to-back direction of the tractive element to define a first roller offset distance; and a second set of split rollers including a third roller rotatably coupled to the first support plate with a third axis of rotation and a fourth roller rotatably coupled to the second support plate with a fourth axis of rotation, the third axis of rotation and the fourth axis of rotation being spaced apart from one another along the front-to-back direction of the tractive element to define a second roller offset distance;

wherein the first, second, third, and fourth axes of rotation are arranged along the front-to-back direction with the first axis of rotation closest to a first end of the tractive element, the fourth axis of rotation closest to a second end of the tractive element that is opposite the first end, the second axis of rotation between the first and fourth axes of rotation, and the third axis of rotation between the second and fourth axes of rotation;

wherein the first axis of rotation and the third axis of rotation are spaced apart from one another along the front-to-back direction of the tractive element to define a third roller offset distance;

wherein a ratio of each of the first, second, and third roller offset distances to the pitch is not a multiple of 0.5; and wherein the ratio of the third roller offset distance to the pitch is greater than 0.5 and less than 0.6.

2. The tractive element of claim 1, wherein the first roller is cantilevered from the first support plate by a first axle that defines the first axis of rotation and the second roller is cantilevered from the second support plate by a second axle that defines the second axis of rotation.

3. The tractive element of claim 1, wherein the first support plate includes a first exterior plate and a first interior plate that is between the first roller and the first exterior plate, relative to the lateral direction; and wherein the second support plate includes a second exterior plate and a second interior plate that is between the second roller and the second exterior plate, relative to the lateral direction.

4. The tractive element of claim 3, wherein the first roller is cantilevered from the first exterior plate by a first axle that defines the first axis of rotation and the second roller is cantilevered from the second exterior plate by a second axle that defines the second axis of rotation.

5. The tractive element of claim 4, wherein the first interior plate includes a first cutout that receives the first roller, and the second interior plate includes a second cutout that receives the second roller.

6. The tractive element of claim 1, wherein a plurality of anti-rotation stop features on the first support and second support plates are symmetrically arranged relative to a reference line that is perpendicular to the front-to-back direction and the lateral direction and extends through the drive sprocket.

7. The tractive element of claim 1, wherein a plurality of mounting locations for the first and second sets of split rollers on the first and second support plates are symmetrically arranged relative to a reference line that is perpendicular to the front-to-back direction and the lateral direction.

8. The tractive element of claim 1, wherein the second roller offset distance is equal to the first roller offset distance.

9. The tractive element of claim 1, wherein the first, second, third, and fourth axes of rotation are collectively symmetrically spaced relative to a reference line on the tractive element that is perpendicular to the front-to-back direction and the lateral direction, with the first and second axes of rotation on a first side of the reference line and the third and fourth axes of rotation on a second side of the reference line that is opposite the first side.

10. The tractive element of claim 9, wherein the reference line corresponds to a drive axis defined by the drive sprocket.

11. The tractive element of claim 9, wherein the tractive element is a quad-track assembly configured to be selectively installed at any of a front-right, front-left, rear-right, and rear-left position on the power machine.

12. The tractive element of claim 1, wherein a ratio of the first roller offset distance to the pitch is greater than 2.0 and less than 2.5.

13. The tractive element of claim 12, wherein a ratio of the second roller offset distance to the pitch is greater than 2.0 and less than 2.5.

14. The tractive element of claim 1, wherein the first axis of rotation and the fourth axis of rotation are spaced apart from each other along the front-to-back direction to define an outside roller offset distance; and wherein a ratio of the outside roller offset distance to the pitch is greater than 2.5 and less than 3.0.

15. The tractive element of claim 1, wherein the second axis of rotation and the third axis of rotation are spaced apart from each other along the front-to-back direction to define an inside roller offset distance; and wherein a ratio of the inside roller offset distance to the pitch is greater than 1.0 and less than 1.5.

16. A power machine comprising:

a power machine frame that supports a work element;

an axle assembly including:

a first front axle extending outwardly from a first side of the power machine frame, proximate a front of the power machine frame;

a second front axle extending outwardly from a second side of the power machine frame, proximate the front of the power machine frame;

a first rear axle extending outwardly from the first side of the power machine frame, proximate a rear of the power machine frame; and a second rear axle extending outwardly from the second side of the power machine frame, proximate the rear of the power machine frame; and a quad-track arrangement including:

a first tractive element operatively coupled to the first front axle;

a second tractive element operatively coupled to the second front axle;

a third tractive element operatively coupled to the first rear axle; and a fourth tractive element operatively coupled to the second rear axle;

wherein at least one of the first, second, third, and fourth tractive elements includes:

a track frame having a first support plate spaced apart from a second support plate;

an endless track surrounding and supported by the track frame, the endless track including a plurality of embeds that define a pitch;

a drive sprocket rotatably coupled to the track frame, the drive sprocket being engaged with the embeds to rotate the endless track around the track frame; and a set of rollers including, in order from front to back: a first roller rotatably coupled to the first support plate with a first axis of rotation, a second roller rotatably coupled to the second support plate with a second axis of rotation, a third roller rotatably coupled to the first support plate with a third axis of rotation, and a fourth roller rotatably coupled to the second support plate with a fourth axis of rotation; and wherein a spacing between the first and second axes of rotation is greater than 0.5 times the pitch and less than 0.6 times the pitch.

17. The power machine of claim 16, wherein one or more of:

a spacing between the first and third axes of rotation is greater than 2.0 times the pitch and less than 2.2 times the pitch;

a spacing between the second and fourth axes of rotation is greater than 2.0 times the pitch and less than 2.2 times the pitch;

a spacing between the first and fourth axes of rotation is greater than 2.5 times the pitch and less than 2.7 times the pitch; or a spacing between the second and third axes of rotation is greater than 1.3 times the pitch and less than 1.5 times the pitch.

18. The power machine of claim 17, wherein any one of the first, second, third, and fourth tractive elements can be selectively installed at any of the first front, second front, first rear, and second rear axles.

19. The power machine of claim 18, wherein each of the first, second, third, and fourth tractive elements is operatively couplable to any of the first front, second front, first rear, and second rear axles.

20. The power machine of claim 19, wherein each of the first, second, third, and fourth tractive elements includes, respectively:

a track frame having a first support plate spaced apart from a second support plate;

an endless track surrounding and supported by the track frame, the endless track including a plurality of embeds that define a pitch;

a drive sprocket rotatably coupled to the track frame, the drive sprocket being engaged with the embeds to rotate the endless track around the track frame; and a set of rollers including:

a first roller rotatably coupled to the first support plate with a first axis of rotation;

a second roller rotatably coupled to the second support plate with a second axis of rotation;

a third roller rotatably coupled to the first support plate with a third axis of rotation; and a fourth roller rotatably coupled to the second support plate with a fourth axis of rotation; and wherein, for each of the first, second, third, and fourth tractive elements, when the tractive element is mounted to any of the first front, second front, first rear, or second rear axles, one or more of:

the set of rollers is symmetrically spaced about a plane corresponding to a pivot axis of the tractive element relative to the power machine frame; or a first anti-rotation stop on the tractive element is symmetrical to a second anti-rotation stop on the tractive element about the plane corresponding to the pivot axis of the tractive element relative to the power machine frame.

21. A power machine comprising:

a power machine frame that supports an operator station;

a work element operably coupled to the power machine frame;

a power source supported by the power machine frame and configured to power movement of the work element; and a tractive element secured to the power machine frame and configured to be powered by the power source to provide tractive force for the power machine, the tractive element including:

a track frame having a first support plate spaced from a second support plate;

an endless track surrounding and being supported by the track frame;

a drive sprocket rotatably coupled to the track frame, the drive sprocket being configured to engage and rotate the endless track; and a first set of split rollers including a first roller rotatably coupled to the first support plate with a first axis of rotation and a second roller rotatably coupled to the second support plate with a second axis of rotation, wherein the first axis of rotation and the second axis of rotation are spaced apart along a front-to-back direction of the tractive element to define a first roller offset distance, a ratio of the first roller offset distance to a pitch of the endless track is not a multiple of 0.5, and the ratio of the first roller offset distance to the pitch of the endless track is greater than 0.5 and less than 0.6.

22. The power machine of claim 21, wherein the endless track is a rubber endless track having a plurality of evenly spaced embeds that define the pitch of the endless track.

23. The power machine of claim 21, wherein the endless track is a metal endless track.

24. The power machine of claim 21, wherein the tractive element further includes a second set of split rollers, including a third roller rotatably coupled to the first support plate with a third axis of rotation and a fourth roller rotatably coupled to the second support plate with a fourth axis of rotation, the third axis of rotation and the fourth axis of rotation being spaced apart from one another along the front-to-back direction of the tractive element to define a second roller offset distance.

25. The power machine of claim 24, wherein bodies of adjacent sets of the first, second, third, and fourth rollers overlap along the front-to-back direction.

* * * * *